United States Patent [19]

Ozasa et al.

[11] Patent Number: 4,993,386

[45] Date of Patent: Feb. 19, 1991

[54] OPERATION CONTROL SYSTEM FOR INTERNAL COMBUSTION ENGINE

[75] Inventors: Toshihiro Ozasa; Shigeo Suzuki; Keiichi Saji; Haruyoshi Kondo; Hideaki Takahashi, all of Aichi, Japan

[73] Assignee: Kabushiki Kaisha Toyota Chuo Kenkyusho, Aichi, Japan

[21] Appl. No.: 459,421

[22] Filed: Dec. 29, 1989

[30] Foreign Application Priority Data

Dec. 29, 1988 [JP] Japan ............................... 63-334181
Dec. 29, 1988 [JP] Japan ............................... 63-334182
Dec. 29, 1988 [JP] Japan ............................... 63-334183

[51] Int. Cl.⁵ .................. F02B 5/04; F02B 47/02; F02B 75/12; F02M 51/00
[52] U.S. Cl. ................................. 123/417; 123/25 J; 123/41.02; 123/1 A; 123/489; 123/480; 123/48.0 AA
[58] Field of Search ................. 123/1 A, 25 R, 25 P, 123/25 C, 25 D, 25 J, 41.01, 41.02, 417, 440, 489, 48 AA

[56] References Cited

U.S. PATENT DOCUMENTS

| 4,031,864 | 6/1977 | Crothers | 123/1 A |
| 4,402,296 | 9/1983 | Schwarz | 123/1 A |
| 4,884,530 | 12/1989 | Boekhaus et al. | 123/1 A |
| 4,909,225 | 3/1990 | Gonze et al. | 123/1 A |
| 4,913,099 | 4/1990 | Ota | 123/1 A |
| 4,945,882 | 8/1990 | Brown et al. | 123/440 |

FOREIGN PATENT DOCUMENTS

| 50-6893 | 3/1975 | Japan | |
| 0059046 | 4/1982 | Japan | 123/489 |
| 0028557 | 2/1983 | Japan | 123/1 A |
| 60-75728 | 4/1985 | Japan | |
| 0096743 | 5/1987 | Japan | 123/440 |
| 0294739 | 12/1987 | Japan | 123/440 |
| 0005130 | 1/1988 | Japan | 123/440 |
| 63-19687 | 4/1988 | Japan | |

OTHER PUBLICATIONS

SAE Technical Paper Series, "Intercooling Effects of Methanol on Turbocharged Diesel Engine Performance and Exhaust Emissions", pp. 1–7.

Primary Examiner—Tony M. Argenbright
Assistant Examiner—Robert L. Mates
Attorney, Agent, or Firm—Oblon, Spivak, McClelland, Maier & Neustadt

[57] ABSTRACT

An operation control system for an engine using alcohol fuel or mixed fuel of alcohol and hydrocarbon, or for an engine supplying cooling liquid such as alcohol, water or the like as fuel. Vapor concentration in exhaust gas and an air excess ratio of air-fuel mixture are detected, and a supply rate of alcohol, a water absorption ratio of alcohol or an amount of the cooling liquid is computed on the basis of the vapor concentration and the air excess ratio. Ignition timing, temperature of the coolant, a compression ratio and an air excess ratio are controlled on the basis of the supply rate of alcohol or the water absorption ratio of alcohol. Further, the cooling liquid is supplied which has its amount computed at a heavy load. Thus, operational performance of the engine is improved.

20 Claims, 22 Drawing Sheets

FIG. 3
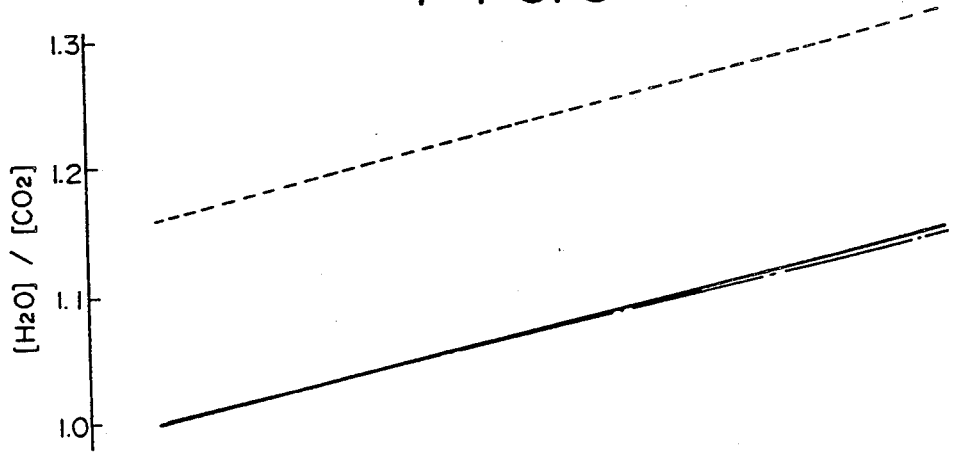
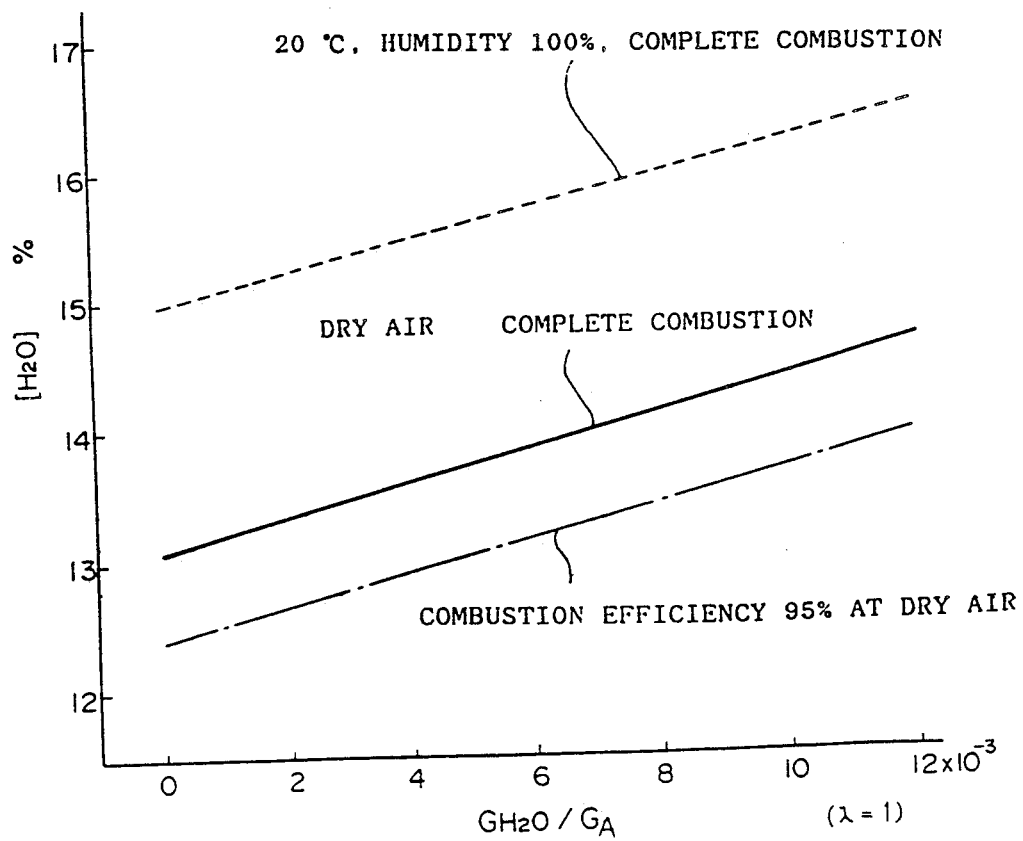

FIG.6 (1)
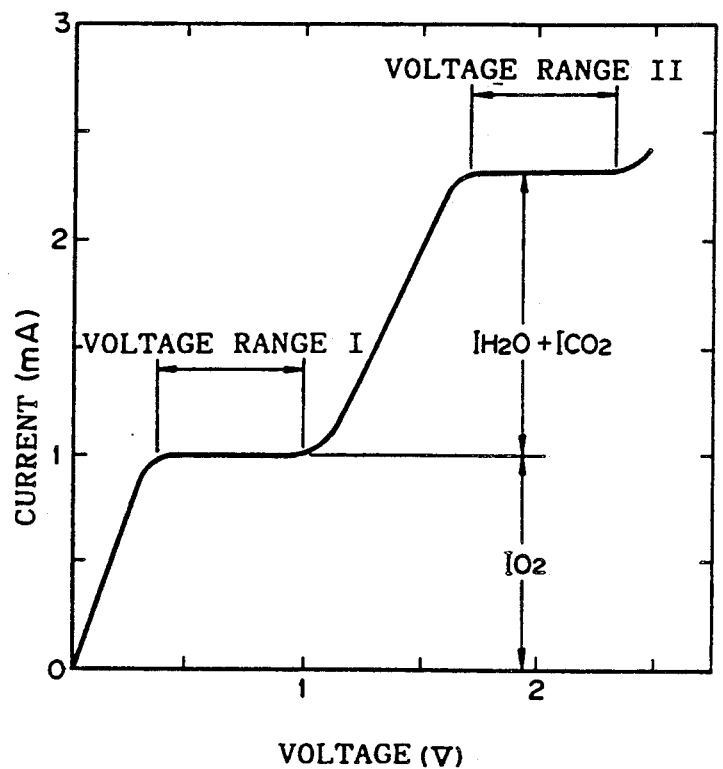
FIG.6 (2)
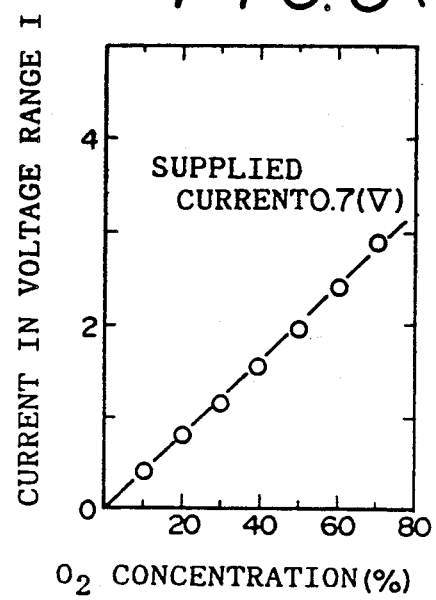

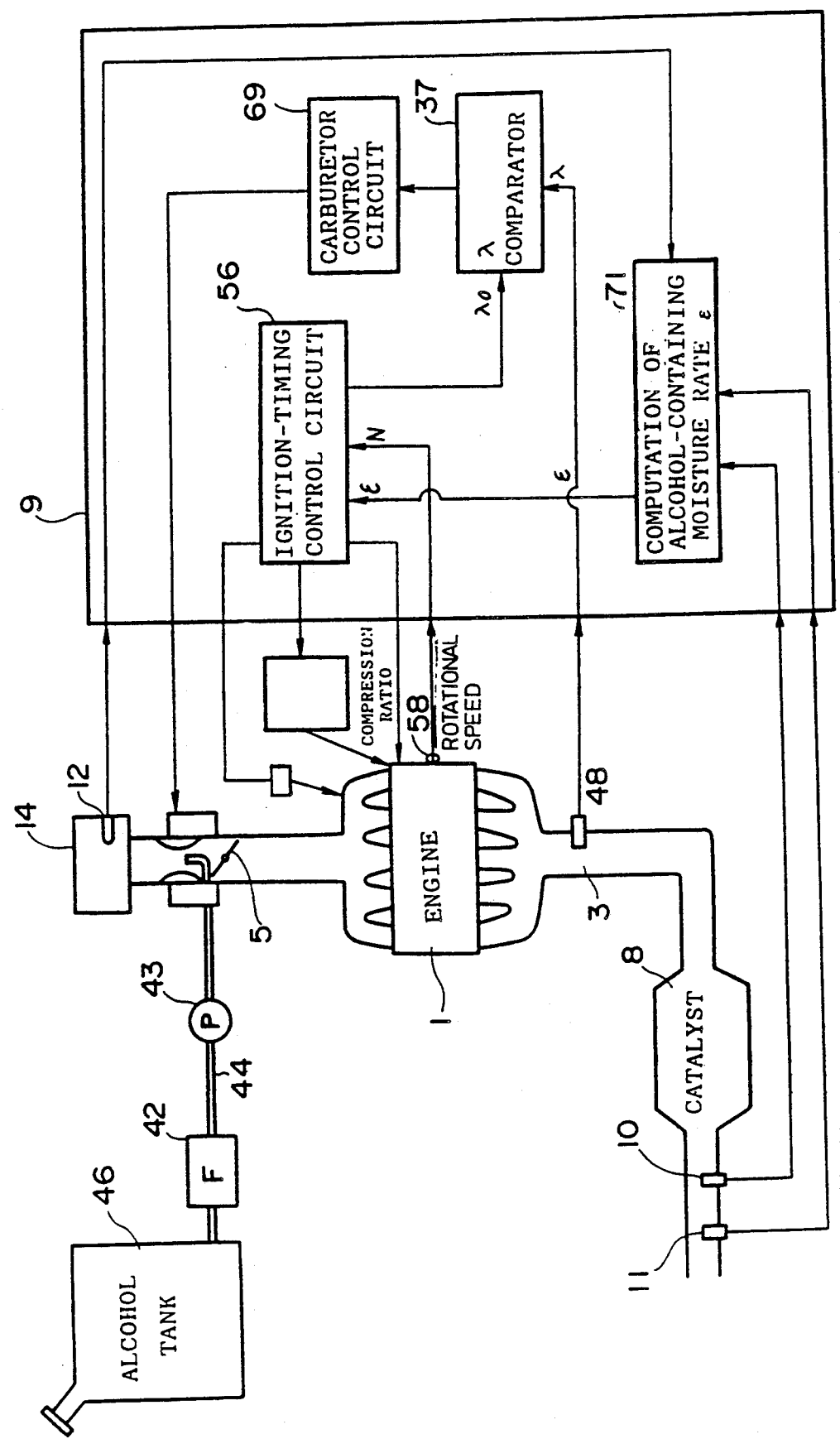
F I G. 18

OPERATION CONTROL SYSTEM FOR INTERNAL COMBUSTION ENGINE

BACKGROUND OF THE INVENTION

Field of the Invention

The present invention relates to internal combustion engines and, more particularly, to an operation control system for an internal combustion engine of a vehicle, for controlling an amount of control which determines characteristics of the internal combustion engine in accordance with a mixture ratio of alcohol, hydrocarbon and water supplied to the internal combustion engine.

Description of the Related Art

Utilization Technique of Mixed Fuel of Hydrocarbon and Alcohol (1) Phase Separation of Mixed Fuel of Hydrocarbon and Alcohol In view of fuel conditions in recent years, various fuel utilization techniques of mixed fuel of hydrocarbon and alcohol have been developed. A first one of the techniques relates to change of a mixture ratio because of phase separation between the alcohol and the hydrocarbon in the mixed fuel in which the hydrocarbon and the alcohol were previously mixed with each other. For instance, as disclosed in Japanese Patent Publication No. SHO 63-19687, an alcohol sensor is utilized to detect a mixture ratio of alcohol and gasoline within a fuel tank or a fuel supply unit, thereby controlling an engine. In the sensor used in this method, a method of measuring electric constant or electric conductivity of liquid is the subject and, therefore, dissolution and mixing of inorganic material into the mixed fuel tends to affect or influence an output of the engine. Thus, it is impossible to accurately measure the mixture ratio. Accordingly, it is required to know the mixture ratio of the mixed fuel burned in a cylinder accurately and more stably.

(2) Hydrocarbon and Alcohol Fuel of Optional Mixture Ratio

A second technique relates to fuel in which hydrocarbon and alcohol are mixed with each other, that is, to fuel in which a mixture ratio is unknown. There is a case where a mixed fuel of hydrocarbon and alcohol is used because a mixture ratio changes due to fuel circumstances or the like. For this reason, it is required that the internal combustion engine be controlled in accordance with the mixture ratio of the fuel. That is, it is important from the points of stable operation and an improved specific fuel consumption of the engine that various operational parameters, such as ignition timing and so on, are optimized in accordance with the mixture ratio of the fuel. Thus, it is required to detect a fuel mixture ratio.

(3) Two-Systematic Supply of Hydrocarbon and Alcohol

An engine, whose fuel is hydrocarbon with an alcohol additive, having the respective fuel tanks for individual hydrocarbon and alcohol, as well as individual fuel supply systems is known. In the engine, because of an improvement in accuracy of an adjusted amount in a supply ratio, not only increased power and avoiding knock can be achieved, but also remarkable improvement of specific fuel consumption can be expected. In a two-systematic supply as disclosed in SAE Paper 841160 or the like, however, it cannot but rely upon independent control of the respective fuel supply systems. Thus, it is practical in the present state that a large deviation or error occurs from a setting target. In order to decrease the deviation from setting target, it is necessary to detect the supply ratio of hydrocarbon and alcohol. In the prior art, however, there is no alcohol concentration sensor which is used in the two-systematic fuel supply. It is a subject or task in this system that how the alcohol supply ratio is easily detected to improve the supply accuracy.

From the above, in the two-systematic supply of variable mixture of alcohol and hydrocarbon, detection of the mixture ratio after combustion within the cylinder and feed-back control thereof are necessary.

Utilization Technique of Alcohol Fuel (4) Water Absorption of Alcohol

Alcohol has affinity for water, and has a nature which dissolves water of condensed atmospheric moisture in a fuel tank. Further, the solubility is not necessarily homogenized in the tank. Water is electrically conductive as is alcohol. Dielectric constant of water is also large at 80.08 (20° C.) compared to methanol at 32.7 and ethanol at 24.6 (25° C.). Accordingly, measurement due to electric conductivity and electric capacity is possible for the time being. Generally, however, water and alcohol tend to contain a dissolution of inorganic material as impurities. Further, an electrode is weak against contamination. Thus, use for a long period of time is difficult. Likewise, there is a method or the like in which a refractive index of light is measured to measure an amount of dissolved water or adsorbed water. In the optical method, too, there is a case where measurement is impossible due to detector contamination.

In addition, since the vaporization heat of water is large compared with alcohol, a delay in transporation in a suction system tends to occur so that the possibility is high in which moisture content within engine suction gas is slightly different from that derived from water content within the fuel tank. Because an increase in the water content directly affects engine performance, there is a need to detect the increase in water content in fuel tank in order to obtain proper control. Likewise, in the mixed fuel of hydrocarbon and alcohol having a known mixture ratio, it is also necessary to know the influence of water absorption.

Water Addition Supply (5) Optimum Water Addition

At a high load, existing gasoline engines are operated at an air-fuel ratio which is considerably rich with respect to a stoichiometric or theoretical air-fuel ratio, because of an increase in load. The reason for this is that the cooling of a cylinder due to surplus fuel raises the charging efficiency of suction gas into the cylinder, thereby avoiding knocking. The surplus fuel, which does not directly participate the combustion, is 30% to 50% of the supplied fuel. However, even with such a rich air-fuel ratio, it is impossible to completely avoid knocking. Generally, ignition timing is delayed or retarded from Minimum Spark Advance for Best Torque (MBT). Further, in existing engines, cooling within the cylinder at a heavy load becomes a serious problem, together with supercharging and an improvement in a compression ratio.

The improvement in fuel consumption at heavy load has become a serious problem, in view of problems of fuel economy in recent years. Thus, the above-described surplus supply of fuel is not preferable.

When water supply with fuel economy is considered together with fuel, it is effective that water is supplied in substitution for the surplus fuel used for cooling. Japanese Patent Publication No. 50-6893 discloses a water supply technique for the purpose of reducing $NO_x$. Since the vaporization heat of water is large as compared with hydrocarbon fuel, a sufficient cooling effect can be expected by a small amount of water while maintaining power output. Further, if the supply amount is little, it is possible to avoid corrosion of the engine and deterioration of lubricating oil. However, reduction in the amount of water supply makes it difficult to accurately control the supply. In the conventional method, the problem still remains because the supply control has not optimally be performed over a wide load range and a wide rotational range of the engine.

A common problem in the prior art as revealed in (1) through (5) above is that control cannot optimally be performed because the suitable detection of the fuel supply in intake port has not been achieved with relative to engine combustion.

SUMMARY OF THE INVENTION

Problems to be solved by the Invention

A task common to (1) through (5) above is that it is first necessary to detect a supply ratio of hydrocarbon and alcohol, a water absorption ratio of the alcohol or an amount of supply of a water addition under a combustion. If the fuel supply state of an engine can be judged on the basis of the combustion condition of the engine, the detection of the condition of fuel supply and engine control are interlocked with each other, whereby more adequate operation is possible.

Here, a first task is to right or correctly detect a condition of fuel supplied to the engine under a burning condition.

A second task is to control adequately on the basis of the detected information.

For the above purposes, according to the invention, there is provided an operation control system for an internal combustion engine, comprising means for supplying air-fuel mixture of fuel and air, into a combustion chamber; means for detecting vapor concentration in exhaust gas; means for detecting an air excess ratio of the air-fuel mixture supplied to the combustion chamber; means for computing a supply condition of the fuel on the bais of the vapor concentration and the air excess ratio; means for computing an amount of control determining a characteristic of the engine, on the basis of the supply condition of the fuel; and means for controlling the engine on the basis of the amount of control.

According to the invention, there is further provided an operation control system for an internal combustion engine, comprising means for detecting vapor concentration in exhaust gas; means for detecting an air excess ratio of air-fuel mixture supplied to a combustion chamber; means for detecting an engine load; means for computing an amount of cooling liquid supplied to the combustion chamber, on the basis of the vapor concentration and the air excess ratio; and means for controlling an amount of fuel supply on the basis of the air excess ratio when the engine load is at least equal to a predetermined value, and for controlling such that the cooling liquid is supplied in addition to the fuel at the time the engine load exceeds the predetermined value thereby bringing the amount of cooling liquid to a target value.

The operation of the invention will be described below. An alcohol supply rate a and a water absorption ratio $\epsilon$ of alcohol under a fuel supply condition, for example, at the time pure alcohol fuel is supplied to a combustion chamber or at the time alcohol fuel and hydrocarbon fuel are supplied, are uniquely determined by vapor concentration [$H_2O$] in exhaust gas at the time the fuel is completely burned and an air-excess ratio $\lambda$ of an air-fuel mixture, as will be described in the below principal of the invention. In the invention, accordingly, the vapor concentration and the air-excess ratio in the exhaust gas are detected, and the condition of the fuel supplying is computed on the basis of the detected vapor concentration and air-excess ratio. An amount of control, which determines characteristics of the engine, is computed on the basis of the computed fuel supplying condition. The engine is controlled on the basis of the computed amount of control. Alcohol is fast in burning velocity, large in vaporization heat, and wide in lean combustion limit, as compared with hydrocarbon. Accordingly, in control of the engine, the ignition timing is retarded in accordance with an increase in the alcohol supply rate, to increase the air excess ratio, thereby raising the temperature of the engine coolant, and thereby raising the compression ratio. Further, if the alcohol supply rate deviates from a predetermined value, a phase separation of the alcohol is nothing but occur. Accordingly, the alcohol and the hydrocarbon should be stirred.

Furthermore, if the water absorption ratio of the alcohol increases, the burning velocity is low and the lean combustion limit proceeds to the rich side. Accordingly, to control of the engine, the ignition timing is advanced, the air excess ratio is lowered, the temperature of the engine coolant is raised, and the compression ratio is raised.

Moreover, an amount of liquid for cooling supplied to the combustion chamber, is determined on the basis of the vapor concentration and the air excess ratio in the exhaust gas, if the moisture within the atmosphere is ignored. Accordingly, control is made such that the cooling liquid is supplied during heavy load, the amount of the cooling liquid supplied being computed on the basis of the vapor concentration and the air excess ratio within the exhaust gas, and the computed amount of the cooling liquid is brought to a target value.

If the moisture within the atmosphere cannot be ignored, the vapor concentration within the atmosphere is detected, and the vapor concentration within the atmosphere is subtracted from the vapor concentration in the exhaust gas, whereby correction is done.

As described above, according to the invention, the condition of the fuel supplied and the amount of the cooling liquid supplied are judged on the basis of computation so that optimum operation control is done. Thus, there is provided such a superior advantage that it is possible to improve the engine performance.

BRIEF DESCRIPTION OF THE DRAWINGS

FIG. 3 is a characteristic view showing a relationship between an amount of water addition and vapor concentration within exhaust gas;

FIG. 6(1) is a current-voltage characteristic view of the limiting current sensor;

FIG. 6(2) is a current-oxygen characteristic view of an oxygen sensor of limiting-current type;

FIG. 18 is a schematic arrangement view of an engine in case where fuel is used whose mixture ratio of single fuel of alcohol or alcohol and hydrocarbon is known, according to a fourth embodiment of the invention;

DESCRIPTION OF THE PREFERRED EMBODIMENTS

Figure 1:
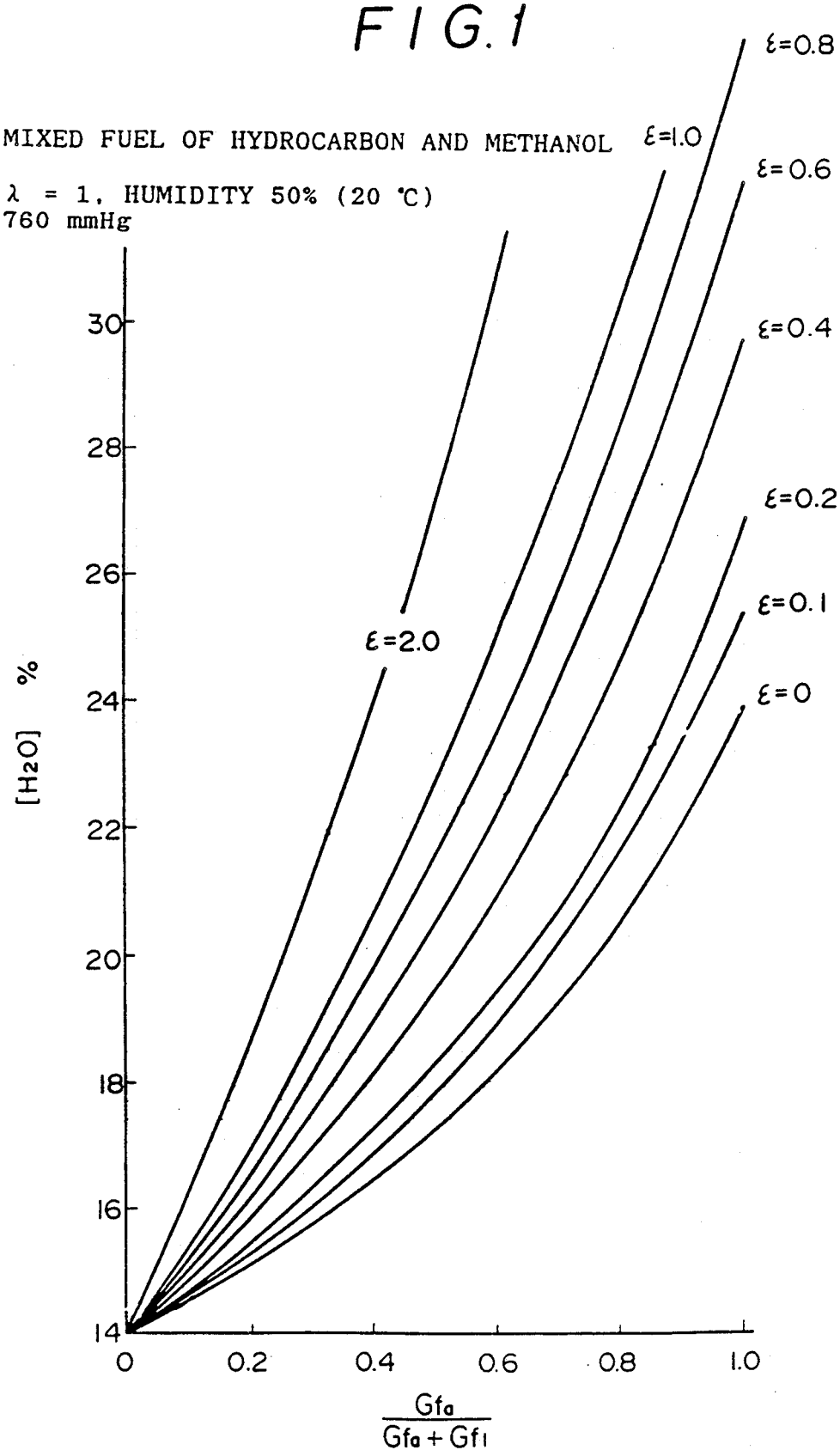
FIG. 1 is a characteristic view showing a relationship between vapor concentration in exhaust gas and a methanol mixing ratio.

A principle of the invention will first be described.

Water Vapor Concentration in Exhaust Gas

When a mixed fuel of hydrocarbon, alcohol and vapor is burned, an equation in case of an assumption of complete combustion is as follows:

$$\alpha \cdot C_1 H_m + \gamma \cdot C_n H_o O_p + \delta \cdot H_2O + \lambda \cdot \quad (1)$$

$$\left( \alpha \cdot 1 + \gamma \cdot n + \frac{\alpha \cdot m + \gamma \cdot o}{4} - \frac{\gamma \cdot p}{2} \right) \cdot$$

$$\left( O_2 + \frac{0.79}{0.21} N_2 \right) = \left( \alpha \cdot 1 + \gamma \cdot n + \frac{\alpha \cdot m + \gamma \cdot o}{4} - \right.$$

$$\left. \frac{\gamma \cdot p}{2} \right) \cdot \left\{ (\lambda - 1)O_2 + \frac{0.79}{0.21} \lambda \cdot N_2 \right\} +$$

$$(\alpha \cdot 1 + \gamma \cdot n) CO_2 + \left( \frac{\alpha \cdot m}{2} + \frac{o}{2} \cdot \gamma + \delta \right) H_2O$$

Here, α, γ and δ are respectively molar numbers of hydrocarbon (molecular formula: $C_l H_m$), alcohol (molecular formula: $C_n H_o O_p$) and water (molecular formula: $H_2O$). λ is an excess ratio.

Further, $$\gamma = \frac{Gf_a}{Mf_a}, \text{ and}$$

$$\alpha = \frac{Gf_1}{Mf}$$

In the above equations, $Mf_a$ is a molecular weight of alcohol, $Mf$ is a mean molecular weight of hydrocarbon fuel, $Gf_a$ is an amount of supply (mass flow rate) of alcohol, and $Gf_1$ is an amount of supply (mass flow rate) of hydrocarbon fuel.

Thus, $[O_2]$, $[H_2O]$ and $[CO_2]$ of $O_2$, $H_2O$ and $CO_2$ concentrations in exhaust gas are as follows:

$$[O_2] = (\lambda - 1) \left( \alpha \cdot 1 + \gamma \cdot n + \frac{\alpha \cdot m + \gamma \cdot o}{4} - \frac{\gamma \cdot p}{2} \right) / \quad (2)$$

$$\left[ \alpha \cdot 1 + \gamma \cdot n + \frac{\alpha \cdot m + \gamma \cdot o}{2} + \delta + \right.$$

$$\left. \left( \alpha \cdot 1 + \gamma \cdot n + \frac{\alpha \cdot m + \gamma \cdot o}{4} - \frac{\gamma \cdot p}{2} \right) \cdot \left( \frac{\lambda}{0.21} - 1 \right) \right]$$

$$[H_2O] = \left( \frac{\alpha \cdot m + \gamma \cdot o}{2} + \delta \right) / \quad (3)$$

$$\left[ \alpha \cdot 1 + \gamma \cdot n + \frac{\alpha \cdot m + \gamma \cdot o}{2} + \delta + \right.$$

$$\left. \left( \alpha \cdot 1 + \gamma \cdot n + \frac{\alpha \cdot m + \gamma \cdot o}{4} - \frac{\gamma \cdot p}{2} \right) \cdot \left( \frac{\lambda}{0.21} - 1 \right) \right]$$

$$[CO_2] = (\alpha \cdot 1 + \gamma \cdot n) / \left[ \alpha \cdot 1 + \gamma \cdot n + \frac{\alpha \cdot m + \gamma \cdot o}{2} + \quad (4) \right.$$

-continued $$\delta + \left(\alpha \cdot 1 + \gamma \cdot n + \frac{\alpha \cdot m + \gamma \cdot o}{4} - \frac{\gamma \cdot p}{2}\right).$$

$$\left(\frac{\lambda}{0.21} - 1\right)\bigg]$$

In the above equations, δ corresponds to the atmospheric humidity and water contained in the alcohol or to H$_2$O due to the additive supply of water, that is, to an amount of moisture contained in the air-fuel mixture before combustion. It is assumed that the moisture per one mol of the hydrocarbon fuel is $\delta_1$ [mol], the relative humidity is Z, the atmospheric pressure is P, and the saturated vapor pressure is P$_s$. Then, $\delta_1$ is as follows:

$$\delta_1 = \frac{Z \cdot P_S}{P - Z \cdot P_S} \lambda \left(\alpha \cdot 1 + \gamma \cdot n + \frac{\alpha \cdot m + \gamma \cdot o}{4} - \frac{\gamma \cdot p}{2}\right) \cdot \left(1 + \frac{0.79}{0.21}\right) \quad (5)$$

Further, the water absorption ratio ε of the alcohol is obtained if the amount of moisture $\delta_1$ due to the atmospheric humidity is subtracted from the amount of moisture δ in the air-fuel mixture before combustion. Accordingly, when the molecular weight of water is $M_{H2O}$, the water absorption ratio (water content ratio) ε of water in alcohol is expressed as follows:

$$\epsilon = \frac{G_{H2O}}{G_{fa}} = \frac{(\delta - \delta_1) \cdot M_{H2O}}{\gamma \cdot M_{fa}} \quad (6)$$

On the other hand, it is assumed that the rate (mixture ratio) of the alcohol in the entire fuel is a. Then, the following equation is obtained:

$$a = \frac{G_{fa}}{G_{fa} + G_{f1}} \quad (7)$$

It will hereinafter be shown that [H$_2$O], [$_2$] and [CO$_2$] in the exhaust gas are expressed respectively by λ, a and ε and under the atmospheric conditions (P, P$_s$, Z).

In the fuel mixture of alchol and hydrocarbon, a<1, and α>0. Since $\gamma = G_{fa}/M_{fa}$ and $\alpha = G_{f1}/M_f$, if λ is expressed using a and α, the following equation is obtained:

$$\gamma = \frac{G_{fa}}{G_{f1}} \cdot \frac{M_f}{M_{fa}} \cdot \alpha = \frac{a}{1-a} \cdot \frac{M_f}{M_{fa}} \cdot \alpha \quad (8)$$

On the other hand, the molecular weight $M_f$ of hydrocarbon, the molecular weight $M_{fa}$ of alcohol and the molecular weight $M_{H2O}$ of water are as follows:

$M_f = 12 \cdot l + m$, $M_{fa} = 12 \cdot n + o + 16p$, and $M_{H2O} = 18$

Accordingly, if compositions of the fuel used are determined, l, m, n, o and p are determined respectively as constants. In this connection, gasoline and diesel fuel utilize mean or average compositions. Generally, m/l=1.5 to 2.0.

If the equation (5) is substituted for the equation (8), the following functional expression can be made:

$$\delta_1 = \alpha \cdot f_1(\lambda, a, P, P_s, Z) \quad (9)$$

If the equation (6) is substituted for the above equation, and if the above equation is solved regarding δ, the following relationship holds:

$$\delta = \alpha \cdot f_2(\epsilon, \lambda, a, P, P_s, Z) \quad (10)$$

When the equations (2) through (4) are substituted for the equations (8) and (10), α in the numerators and the denominators disappears, and the following relationships are obtained:

$$[O_2] = g_1(\epsilon, \lambda, a, P, P_s, Z) \quad (11)$$

$$[H_2O] = g_2(\epsilon, \lambda, a, P, P_s, Z) \quad (12)$$

$$[CO_2] = g_3(\epsilon, \lambda, a, P, P_s, Z) \quad (13)$$

That is, from the equation (5), there is obtained the following relationship:

$$\delta_1 = \frac{Z \cdot P_S}{P - Z \cdot P_S} \cdot \frac{\lambda}{0.21} \left\{ \left(1 + \frac{m}{4}\right)\alpha + \left(n + \frac{o}{4} - \frac{p}{2}\right)\gamma \right\}$$

$$= \alpha \cdot \frac{Z \cdot P_S}{P - Z \cdot P_S} \cdot \frac{\lambda}{0.21} \left\{ 1 + \frac{m}{4} + \left(n + \frac{o}{4} - \frac{p}{2}\right)\frac{a}{1-a} \cdot \frac{M_f}{M_{fa}} \right\}$$

$$= \alpha \cdot f_1(\lambda, a, P, P_S, Z)$$

where $M_f/M_{fa}$ is a constant value.

$$\therefore f_1(\lambda, a, P, P_S, Z) = \frac{Z \cdot P_S}{P - Z \cdot P_S} \cdot \frac{\lambda}{0.21} \left\{ 1 + \frac{m}{4} + \left(n + \frac{o}{4} - \frac{p}{2}\right)\frac{a}{1-a} \cdot \frac{M_f}{M_{fa}} \right\}$$

When the equation (6) is solved regarding δ, the following relationship is obtained:

$$\delta = \epsilon \cdot \gamma \cdot \frac{M_{fa}}{M_{H2O}} + \delta_1$$

$$= \epsilon \cdot \frac{a}{1-a} \cdot \frac{M_f}{M_{fa}} \cdot \frac{M_{fa}}{M_{H2O}} \cdot \alpha + \alpha \cdot f_1(\lambda, a, P, P_S, Z)$$

$$= \alpha \cdot \left( \epsilon \cdot \frac{a}{1-a} \cdot \frac{M_f}{M_{H2O}} \cdot \frac{M_f}{M_{fa}} + f_1(\lambda, a, P, P_S, Z) \right)$$

$$= \alpha \cdot f_2(\epsilon, \lambda, a, P, P_S, Z)$$

$$\therefore f_2(\epsilon, \lambda, a, P, P_S, Z) = \epsilon \cdot \frac{a}{1-a} \cdot \frac{M_f}{M_{H2O}} \cdot \frac{M_f}{M_{fa}} + f_1(\lambda, a, P, P_S, Z)$$

When the equation (2) through (4) are substituted for the equation (8) and (10), the following relationships are obtained:

$[O_2] = g_1(\epsilon,\lambda,a,P,P_S,Z)$ $$= \frac{(\lambda - 1) \cdot \left\{ 1 + \frac{m}{4} + \left(n + \frac{o}{4} - \frac{p}{2}\right) \cdot \frac{a}{1-a} \cdot \frac{Mf}{Mf_a} \right\}}{\frac{m}{4} + \left(1 + \frac{m}{4}\right)\frac{\lambda}{0.21} + \frac{a}{1-a} \cdot \frac{Mf}{Mf_a} \left\{ \frac{o}{4} + \frac{p}{2} + \left(n + \frac{o}{4} - \frac{p}{2}\right) \cdot \frac{\lambda}{0.21} \right\} + f_2(\epsilon,\lambda,a,P,P_S,Z)}$$

$[H_2O] = g_2(\epsilon,\lambda,a,P,P_S,Z)$ $$= \frac{\frac{m}{2} + \frac{o}{2} \cdot \frac{a}{1-a} \cdot \frac{Mf}{Mf_a} + f_2(\epsilon,\lambda,a,P,P_S,Z)}{\frac{m}{4} + \left(1 + \frac{m}{4}\right)\frac{\lambda}{0.21} + \frac{a}{1-a} \cdot \frac{Mf}{Mf_a} \cdot \left\{ \frac{o}{4} + \frac{p}{2} + \left(n + \frac{o}{4} - \frac{p}{2}\right) \cdot \frac{\lambda}{0.21} \right\} + f_2(\epsilon,\lambda,a,P,P_S,Z)}$$

$[CO_2] = g_3(\epsilon,\lambda,a,P,P_S,Z)$ $$= \frac{1 + n \cdot \frac{a}{1-a} \cdot \frac{Mf}{Mf_a}}{\frac{m}{4} + \left(1 + \frac{m}{4}\right) \cdot \frac{\lambda}{0.21} + \frac{a}{1-a} \cdot \frac{Mf}{Mf_a} \left\{ \frac{o}{4} + \frac{p}{2} + \left(n + \frac{o}{4} - \frac{p}{2}\right)\frac{\lambda}{0.21} \right\} + f_2(\epsilon,\lambda,a,P,P_S,Z)}$$

That is, the exhaust components are determined by the air excess ratio $\lambda$, the alcohol ratio a in the fuel and the absorption ratio $\epsilon$ of water in alcohol under the atmospheric conditions (P, $P_s$, Z). Here, $f_1$, $f_2$, $g_1$, $g_2$ and $g_3$ express functions which are derived from the above description.

Figure 2:
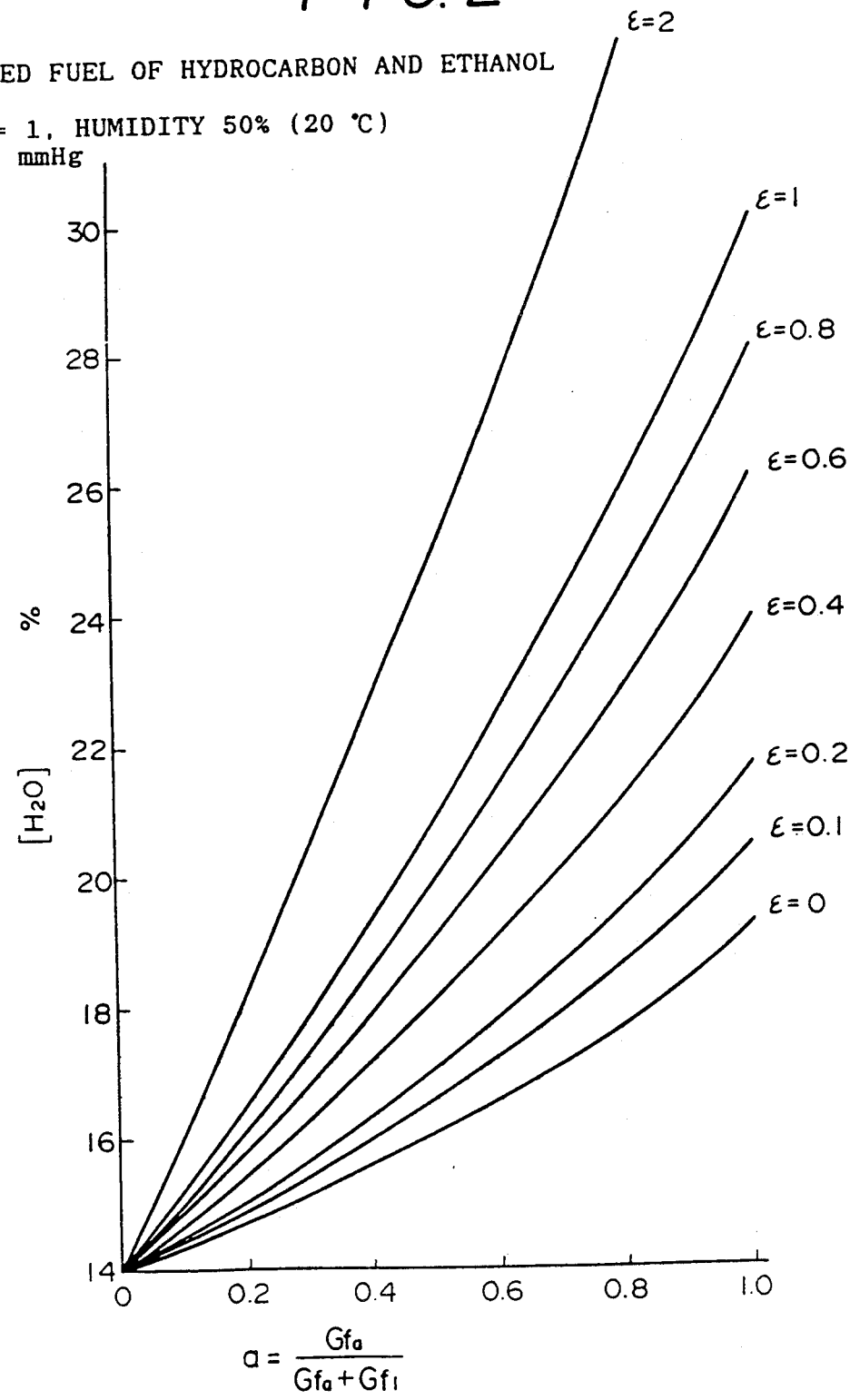
FIG. 2 is a characteristic view showing a relationship between vapor concentration in exhaust gas and a ethanol mixing ratio.

Since the vapor concentration $[H_2O]$ in the exhaust gas is expressed by $g_2(\epsilon, \lambda, a, P, P_s, Z)$, consideration will be made that $\lambda$, P, $P_s$ and Z are constant. For example, consideration will be made for the condition at needed $\lambda = 1$, P = 760 mmHg, $P_s$ = the saturated vapor pressure at 20° C. and Z = 50%. If the relationship between the vapor concentration $[H_2O]$, the water absorption ratio $\epsilon$ and the mixture ratio a is computed and expressed, regarding the mixed fuel of hydrocarbon and methanol and the mixed fuel of hydrocarbon and ethanol, the relationship is as shown in FIGS. 1 and 2. Accordingly, if FIGS. 1 and 2 are used, the following utilization is possible:

(A) $\delta = \delta_1$ in a case where fuel is formed from hydrocarbon and alcohol, methanol or ethanol, and almost no water is mixed with the fuel. Under this condition, a change in the alcohol rate a in the entire fuel is detected. That is, the detection corresponds to the following (1) through (3). In this case, since $\delta = \delta_1$ $\epsilon = 0$ from the equation (6).

(1) A phase separation is detected in case where there is a single fuel tank, and the fuel of hydrocarbon and alcohol, having a known mixture ratio, is supplied.

(2) A mixture ratio a is detected in a case where there is a single fuel tank, and hydrocarbon and alcohol, mixed together at an optional mixture ratio, is supplied.

(3) A supply ratio is detected from the mixture ratio a in a case where a pair of fuel tanks are prepared respectively for hydrocarbon and alcohol, and the fuel is supplied in a two-system manner.

(B) A water absorption ratio $\epsilon$ of alcohol fuel is detected in a case where there is a single fuel tank, and fuel is formed of pure alcohol ($a = 0$) or of hydrocarbon and alcohol whose mixture ratio is known ($a \neq 0$ and a is known). It is possible to use the equations (8) through (13) if $a \neq 0$, and a is known. However, development of another equation is necessary in case of $a = 0$ (in case of pure alcohol). If $a = 0$ in the equations (1) through (6), the following relationship is obtained from the equation (5):

$$\delta_1 = \gamma \cdot f_3(\lambda, P, P_s, Z) \tag{14}$$

When the equation (14) is substituted into the equation (6), the following relationship holds:

$$\delta = \gamma \cdot f_4(\lambda, \epsilon, P, P_s, Z) \tag{15}$$

When the above equation is substituted into the equations (2) through (4), $\gamma$ in the numerators and the demonimantors disappears, and the following equation is obtained:

$$\begin{rcases} [O_2] = g_4(\epsilon,\lambda,P,P_S,Z) \\ [H_2O] = g_5(\epsilon,\lambda,P,P_S,Z) \\ [CO_2] = g_6(\epsilon,\lambda,P,P_S,Z) \end{rcases} \tag{16}$$

That is, when $a = 0$ in the equations (1) through (6), the following relationship is obtained from the equation (5):

$$\delta_1 = \frac{\lambda}{0.21} \cdot \frac{Z \cdot P_S}{P - Z \cdot P_S} \cdot \left(n + \frac{o}{4} - \frac{p}{2}\right) \cdot \gamma$$

$$= \gamma \cdot f_3(\lambda, P, P_S, Z)$$

$$\therefore f_3(\lambda, P, P_S, Z) = \frac{\lambda}{0.21} \cdot \frac{Z \cdot P_S}{P - Z \cdot P_S} \cdot \left(n + \frac{o}{4} - \frac{p}{2}\right)$$

If the equation (6) is solved regarding to $\delta$, the following relationship is obtained:

$$\delta = \epsilon \cdot \gamma \cdot \frac{Mf_a}{M_{H_2O}} + \delta_1$$

$$= \epsilon \cdot \gamma \cdot \frac{Mf_a}{M_{H_2O}} + \gamma \cdot f_3(\lambda, P, P_S, Z)$$

$$= \gamma \cdot f_4(\epsilon, \lambda, P, P_S, Z)$$

$$\therefore f_4(\epsilon, \lambda, P, P_S, Z) = \epsilon \cdot \frac{Mf_a}{M_{H_2O}} + f_3(\lambda, P, P_S, Z)$$

When the above equation is substituted into the equations (2) through (4), the following relationships are obtained:

$[O_2] = g_4(\epsilon,\lambda,P,P_S,Z)$

-continued $$= \frac{(\lambda - 1) \cdot \left(n + \frac{o}{4} - \frac{p}{4}\right)}{n + \frac{o}{2} + \left(n + \frac{o}{4} - \frac{p}{2}\right) \cdot \left(\frac{\lambda}{0.21} - 1\right) + f_4(\epsilon,\lambda,P,P_S,Z)}$$

$$[H_2O] = g_5(\epsilon,\lambda,P,P_S,Z)$$

$$= \frac{\frac{o}{2}\gamma + f_4(\epsilon,\lambda,P,P_S,Z)}{n + \frac{o}{2} + \left(n + \frac{o}{4} - \frac{p}{2}\right) \cdot \left(\frac{\lambda}{0.21} - 1\right) + f_4(\epsilon,\lambda,P,P_S,Z)}$$

$$[CO_2] = g_6(\epsilon,\lambda,P,P_S,Z)$$

$$= \frac{n}{n + \frac{o}{2} + \left(n + \frac{o}{4} - \frac{p}{2}\right) \cdot \left(\frac{\lambda}{0.21} - 1\right) + f_4(\epsilon,\lambda,P,P_S,Z)}$$

Accordingly, if there is only the alcohol fuel, it is possible to determine the exhaust components by the air excess ratio $\lambda$ and the water absorption ratio $\epsilon$ of the alcohol under the atmospheric conditions (P, $P_s$, Z).

(C) A water supply rate is obtained in a case where fuel is hydrocarbon fuel and water is supplied in the form of an additive. In this case, alcohol fuel is not supplied. Accordingly, with the molar number $\gamma$ of alcohol being $\gamma = 0$ the water supply rate is computed by the equations (1) through (5) and the following equation:

$$G_{H2O} = \frac{\delta}{\alpha} M_{H2O} \frac{G/1}{Mf} - \frac{\delta_1}{\alpha} G_A \quad (17)$$

Here, $G_{H2O}$ is an amount of water supply in which an amount of moisture of the atmospheric humidity is subtracted from an amount of moisture contained in the air-fuel mixture before combustion, $M_{H2O}$ is a molecular weight of water, and $G_A$ is an amount of supply of dry air. That is, $\gamma = 0$ in equation (5), and the equation (5) is substituted into the equation (17), to obtain $\delta/\alpha$. Then, $\delta/\alpha$ is as follows:

$$\frac{\delta}{\alpha} = \frac{Mf}{M_{H2O}} \cdot \lambda \cdot (A/F_{st}) \cdot \left\{ \left(\frac{G_{H2O}}{G_A}\right) + \frac{\lambda}{0.21} \frac{Z \cdot P_S}{P - Z \cdot P_S} \left(1 + \frac{m}{4}\right) \right\}$$

Here, $A/F_{st}$ is a stoichiometric or theoretical air-fuel ratio. Accordingly, if $\gamma = 0$ in the equations (2), (3) and (4), $[O_2]$, $[H_2O]$ and $[CO_2]$ are expressed as follows, using $\delta/\alpha$:

$$[O_2] = \frac{(\lambda - 1) \cdot \left(1 + \frac{m}{4}\right)}{\frac{m}{4} + \frac{\delta}{\alpha} + \left(1 + \frac{m}{4}\right) \cdot \frac{\lambda}{0.21}}$$

$$[H_2O] = \frac{\frac{m}{2} + \frac{\delta}{\alpha}}{\frac{m}{4} + \frac{\delta}{\alpha} + \left(1 + \frac{m}{4}\right) \cdot \frac{\lambda}{0.21}}$$

$$[CO_2] = \frac{1}{\frac{m}{4} + \frac{\delta}{\alpha} + \left(1 + \frac{m}{4}\right) \cdot \frac{\lambda}{0.21}}$$

The above $\alpha$ contains $G_{H2O}/G_A$ or an amount of water added per unit mass of suction air, and the air excess ratio $\lambda$. Accordingly, in case where water is supplied in the form of an additive to the hydrocarbon fuel, it is possible to express the vapor concentration $[H_2O]$ in the exhaust gas, in terms of the amount of water $G_{H2O}/G_A$ and the air excess ratio $\lambda$. FIG. 3 shows a relationship between the vapor concentration $[H_2O]$ and the amount of water $G_{H2O}/G_A$ when the air excess ratio is constant, for example, at needed $\lambda = 1$. In this connection, the dotted line in FIG. 3 indicates a relationship in case of dry air and 95% combustion efficiency. The solid lines in FIG. 3 indicate relationships in case of dry air and complete combustion. The broken lines in FIG. 3 indicate relationships in the case of 20° C., 100% humidity and complete combustion. Further, in FIG. 3, a relationship is also revealed between the amount of water $G_{H2O}/G_A$ and a ratio $[H_2O]/[CO_2]$ of the vapor concentration $[H_2O]$ and a carbon-dioxide concentration $[CO_2]$.

The vapor concentration in the exhaust gas varies dependent upon the fuel supplied to the engine and a water supply condition. However, the atmospheric humidity is also an important factor. In fact, a humidity detector is mounted on the suction side to detect the atmospheric humidity.

A sensor for detecting $\lambda$ from the exhaust gas is widely known. A sensor for detecting the vapor concentration, which is capable of being used in the embodiments, will next be described.

Figure 4:
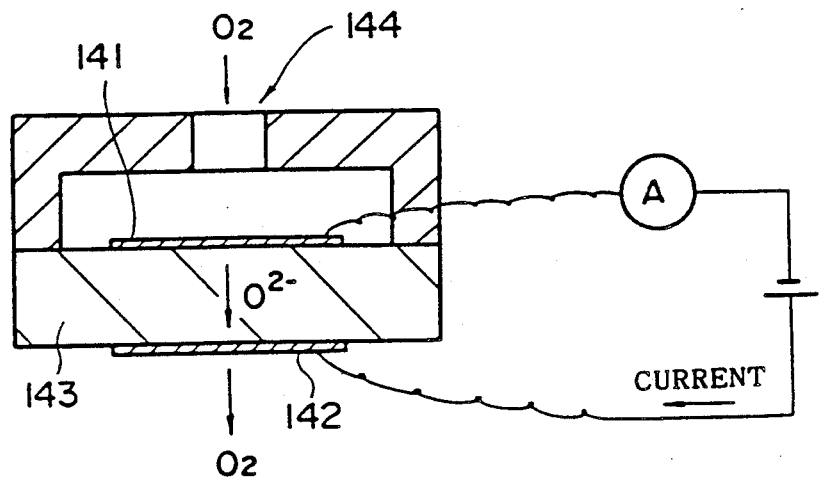
FIG. 4 is a schematic view of a limiting current sensor.

A multicomponent gas sensor 10 will be described with reference to FIGS. 4 through 8. FIG. 4 shows an oxygen sensor of limiting-current type. The sensor is constructed as follows. That is, a zirconia solid electrolyte 143 is clamped between a cathode 141 and an anode 142. The cathode 141 is covered with a cover which is provided with an aperture 144. An electric power source is connected to the cathode 141 and the anode 142. When electric current passes through the zirconia solid electrolyte 143, oxygen flows from the cathode 141, and oxygen is discharged from the anode 142. The aperture 144 provided in the cover is provided for rate-determining inflow of the oxygen to the cathode 141. In this manner, since inflow of the oxygen is rate-determined by the aperture 144, a voltage range I occurs in which voltage increases and current is saturated at a predetermined value as shown in FIG. 6(1). The current (limiting current IO2) in the voltage range I is in proportion to the oxygen concentration. Accordingly, if constant voltage is applied, it is possible to measure the oxygen concentration on the basis of the flowing current.

Further, as the voltage applied to the sensor increases, the sensor current increases again and, subsequently, a two-step saturated current appears in voltage range II. In this voltage range, oxygen, which is generated by the decomposition of $H_2O$ and $CO_2$ existing around the sensor, by means of the cathode 141, is applied to the sensor current. Accordingly, in the voltage range II, diffusion of $H_2O$ and $CO_2$ into the sensor cathode 141 is rate-determined by the aperture 144. Thus, the sensor current in this voltage range is brought to a sum of the component IO₂ in proportion to the oxygen concentration and the component IH₂O and ICO₂ in proportion to H₂O and CO₂.

Here, IO₂, IH₂O and ICO₂ are expressed respectively in the form of the following equations:

$$IO_2 = \frac{4 \cdot F \cdot DO_2 \cdot S \cdot C}{L} [O_2] \quad (18)$$

$$IH_2O = \frac{2 \cdot F \cdot DH_2O \cdot S \cdot C}{L} [H_2O] \quad (19)$$

$$ICO_2 = \frac{2 \cdot F \cdot DCO_2 \cdot S \cdot C}{L} [CO_2] \quad (20)$$

Of the above equations, the current components expressed respectively by the equations (19) and (20) are induced by the following reaction in the cathode 141:

$$H_2O \rightarrow H_2 + \tfrac{1}{2}O_2 \quad (21)$$

$$CO_2 \rightarrow CO + \tfrac{1}{2}O_2 \quad (22)$$

Here, F is the Faraday constant, L is a length of the aperture 144, S is an open area of the aperture 144, and C is a total molar number of gas per unit volume. [O₂], [H₂O] and [CO₂] express respectively the oxygen concentration, the vapor concentration and the carbon dioxide concentration. Further, DO₂, DH₂O and DCO₂ express respectively of oxygen, vapor and carbon dioxide. For example, these diffusivity have their respective values of 1.68 cm³/s, 2.16 cm³/s and 1.44 cm³/s at a temperature of 1000° K. In this connection, reference should be made to "Collection of Thermal Physical Properties of Fluid", pp. 504 and 505, published from the Japan Society of Mechanical Engineer of Aug. 20, 1983.

Moreover, temperature dependencies of the respective [O₂], [H₂O] and [CO₂] are substantially equal to each other. Accordingly, a ratio among the sensor current components IO₂, IH₂O and ICO₂ expressed respectively by the equations (18) through (20) is brought to 1 [O₂]: 0.643 [H₂O]: 0.429 [CO₂]. That is, the sensor current I = IO₂ + IH₂O + ICO₂ in the voltage range II is expressed as follows:

$$I = \frac{4 \cdot F \cdot DO_2 \cdot S \cdot C}{L} ([O_2] + \\ 0.643[H_2O] + 0.429[CO_2]) \quad (23)$$

In this connection, C is a total molal concentration of gas. Here, the oxygen concentration [O₂] can be obtained by measurement of the current in the voltage range I. Further, since the oxygen concentration and the air-fuel ratio have good correlation, it is possible to obtain the air-fuel ratio from the oxygen concentration. On the other hand, a ratio [H₂O]/[CO₂] of the vapor concentration and the carbon dioxide concentration is determined by a ratio of hydrogen and carbon contained in fuel and water which are supplied to the engine according to the invention. An example of computation of the ratio [H₂O]/[CO₂] is revealed in FIG. 3 correspondingly to $G_{H_2O}/G_A$.

Figure 5:
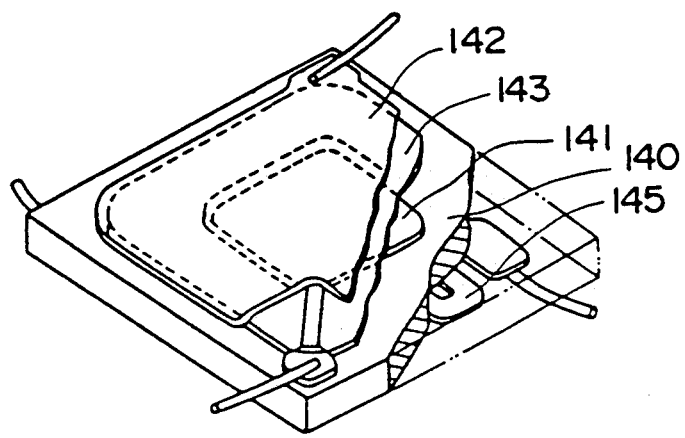
FIG. 5 is a perspective view of the limiting current sensor.

FIG. 5 shows a multicomponent sensor 10 in which the oxygen sensor of limiting current type is put to practical use. The sensor is constructed as follows. That is, a porous aluminum substrate 140 is used as a gas rate-determining body in place of the aperture 144 as seen in FIG. 4. A cathode 141 made of platinum, a zirconia solid electrolyte 143 and an anode 142 made of platinum are successively laminated onto the porous aluminum substrate 140 each other. Further, a heater 145 made of platinum is laminated onto the other side of the porous aluminum substrate 140, to heat the sensor at constant temperature. A current-voltage characteristic of the oxygen sensor of limiting current type shown in FIGS. 4 and 5 is as illustrated in FIG. 6(1), and a current-oxygen concentration characteristic of the oxygen sensor is as illustrated in FIG. 6(2). Accordingly, it is possible to measure the oxygen concentration in the exhaust gas, from a current value passing through the sensor.

Figure 7:
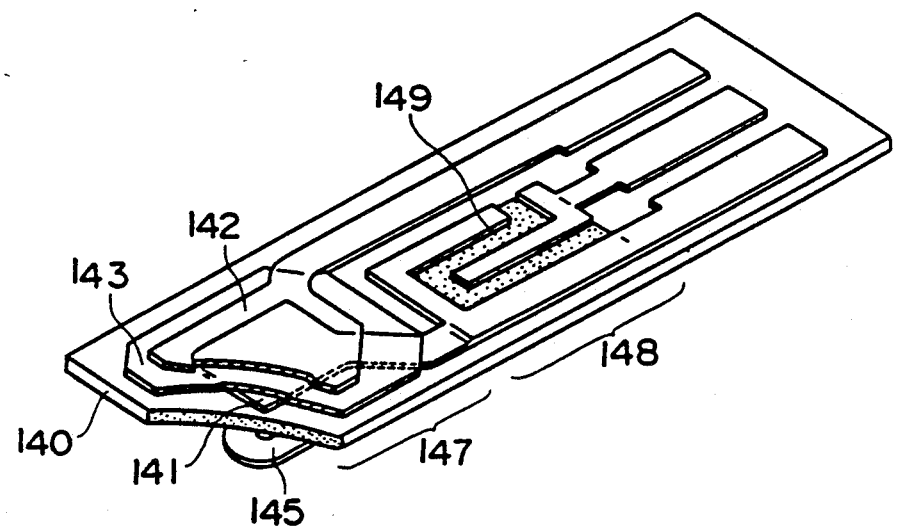
FIG. 7 is a perspective view of a multicomponent gas sensor and a λ sensor ($O_2$-sensor) which are united together.
Figure 8:
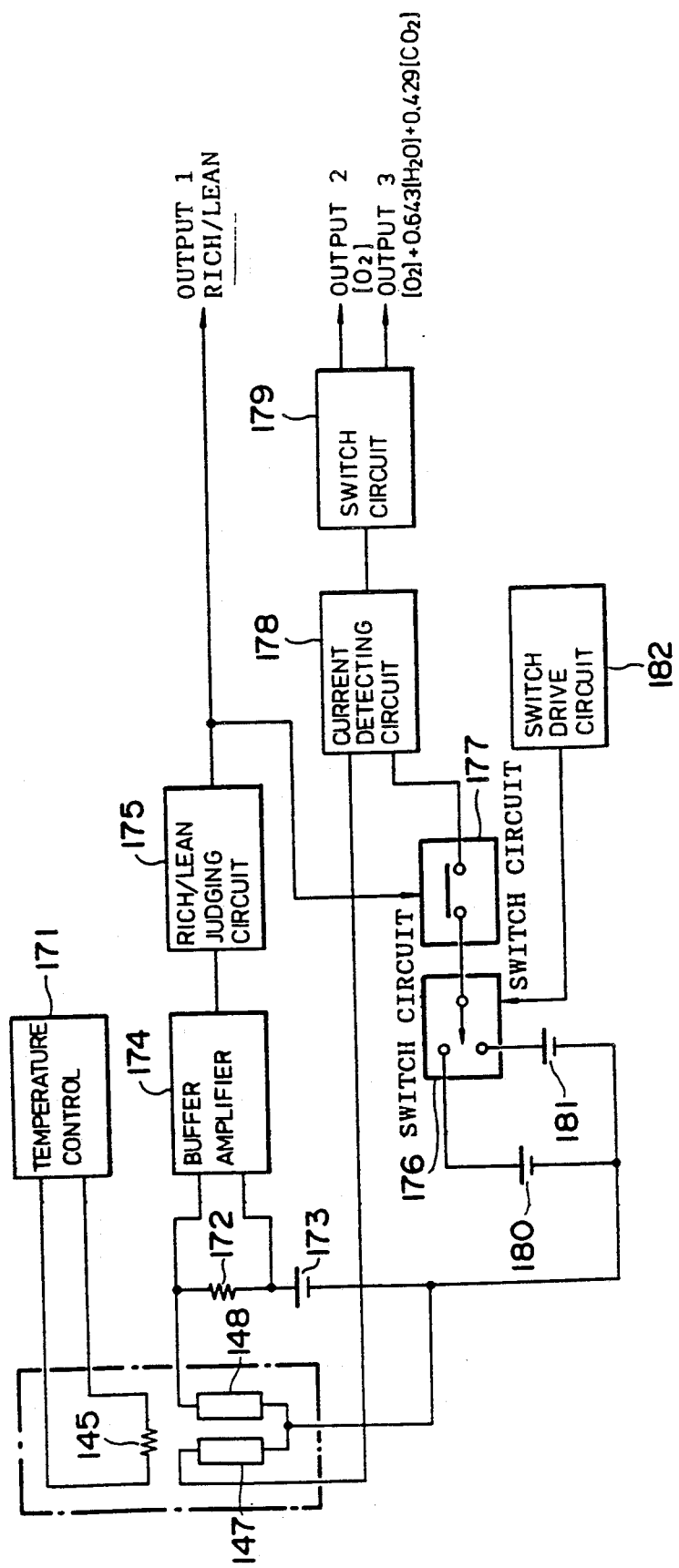
FIG. 8 is a view showing a signal processing circuit of the sensor illustrated in FIG. 7.

FIG. 7 shows a sensor in which the multicomponent sensor 10 and a λ=1 detecting sensor (O₂-sensor) are united together. This composite sensor is constructed such that a multicomponent gas detecting section 147 similar in construction to the oxygen sensor of limiting current type described above and a λ=1 detecting section 148 for detecting a stoichiometric air-fuel ratio (λ=1) are united together. The multicomponent gas detecting section 147 is constructed such that, similarly to the above, a cathode 141 made of platinum, a zirconia solid electrolyte 143 and an anode 143 made of platinum are successively laminated onto a porous aluminum substrate 140. Further, the λ=1 detecting section 148 is constructed as a λ=1 sensor of resistance variable type in which an oxide semiconductor 149 whose resistance changes abruptly by three through five figures at λ=1 is laminated onto the porous aluminum substrate 140. The oxide semiconductor 149 can utilize TiO₂, Nb₂O₅ and C₆O₂ or a mixture thereof. Moreover, a heater 145 is laminated onto the other side of the porous aluminum substrate 140. The heater 140 is constructed such that a sensor, in which λ=1 and multicomponent gas are united together, is heated at predetermined temperature. In case of this sensor, since an output from the multicomponent gas detecting section 147 and an output from the λ=1 detecting section 148 are different from each other, a sensor-signal detecting processing circuit as shown in FIG. 8 is added. The sensor-signal processing circuit comprises a temperature control circuit 171, a reference resistor 172, a power source 173, a buffer amplifier 174, a rich/lean judging circuit 175, a switch circuit 176, a switch circuit 177, a current detecting circuit 178, a switch circuit 179, a pair of power sources 180 and 181 generating voltage in the voltage range I and the voltage range II, and a switch drive circuit 182 for alternately switching the switch circuit 176 at intervals of predetermined time. In this signal processing circuit, an output 1 indicating rich or lean is outputted from the rich/lean judging circuit 175. An outputs 2 ([CO₂]) and an output 3 ([O₂]+0.643[H₂O]+0.429[CO₂]) corresponding respectively to the sensor currents in the voltage ranges I and II are outputted from the switch circuit 179.

Figure 9:
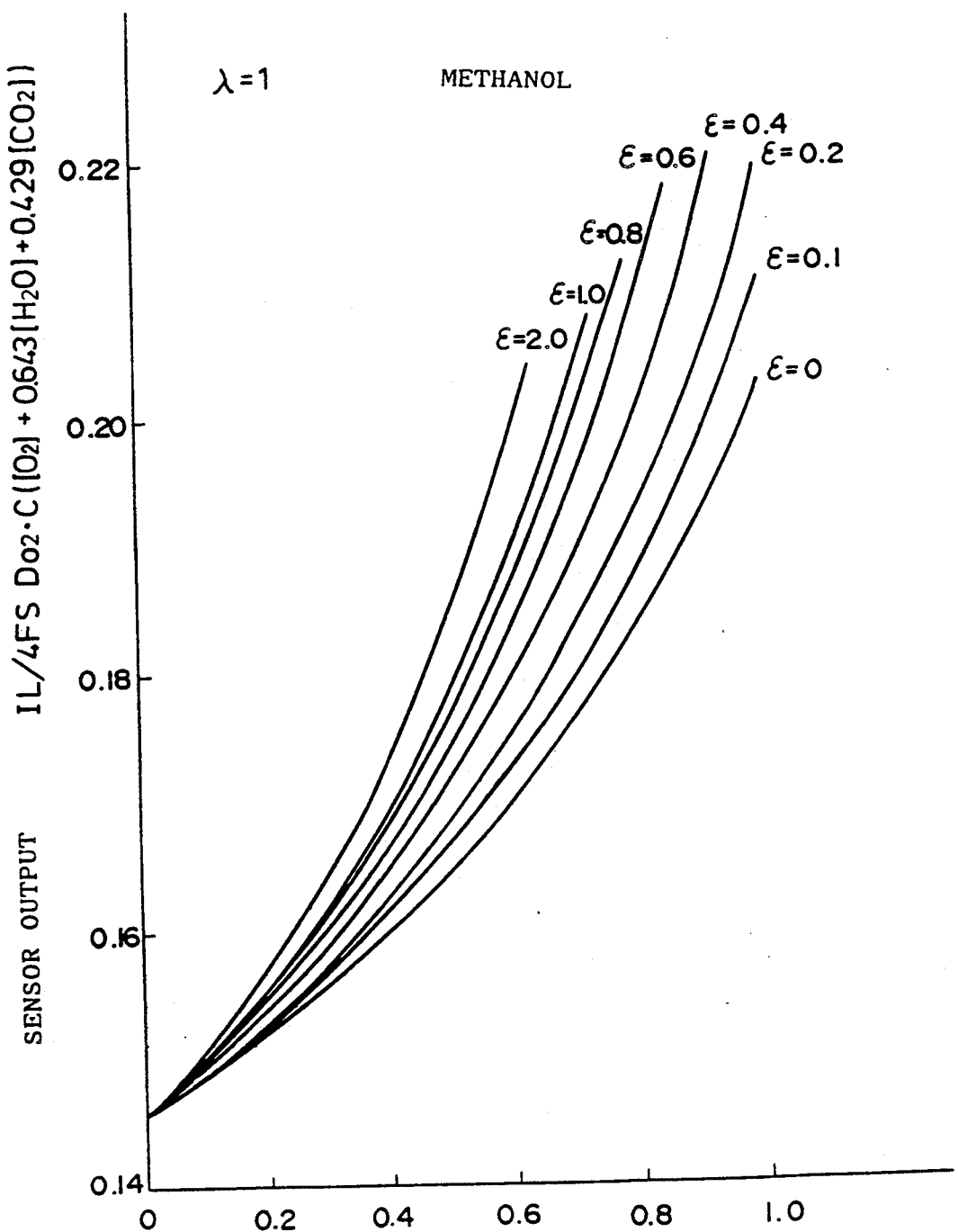
FIG. 9 is a characteristic view showing a relationship between a methanol mixing ratio and an output from the multicomponent gas sensor.
Figure 10:
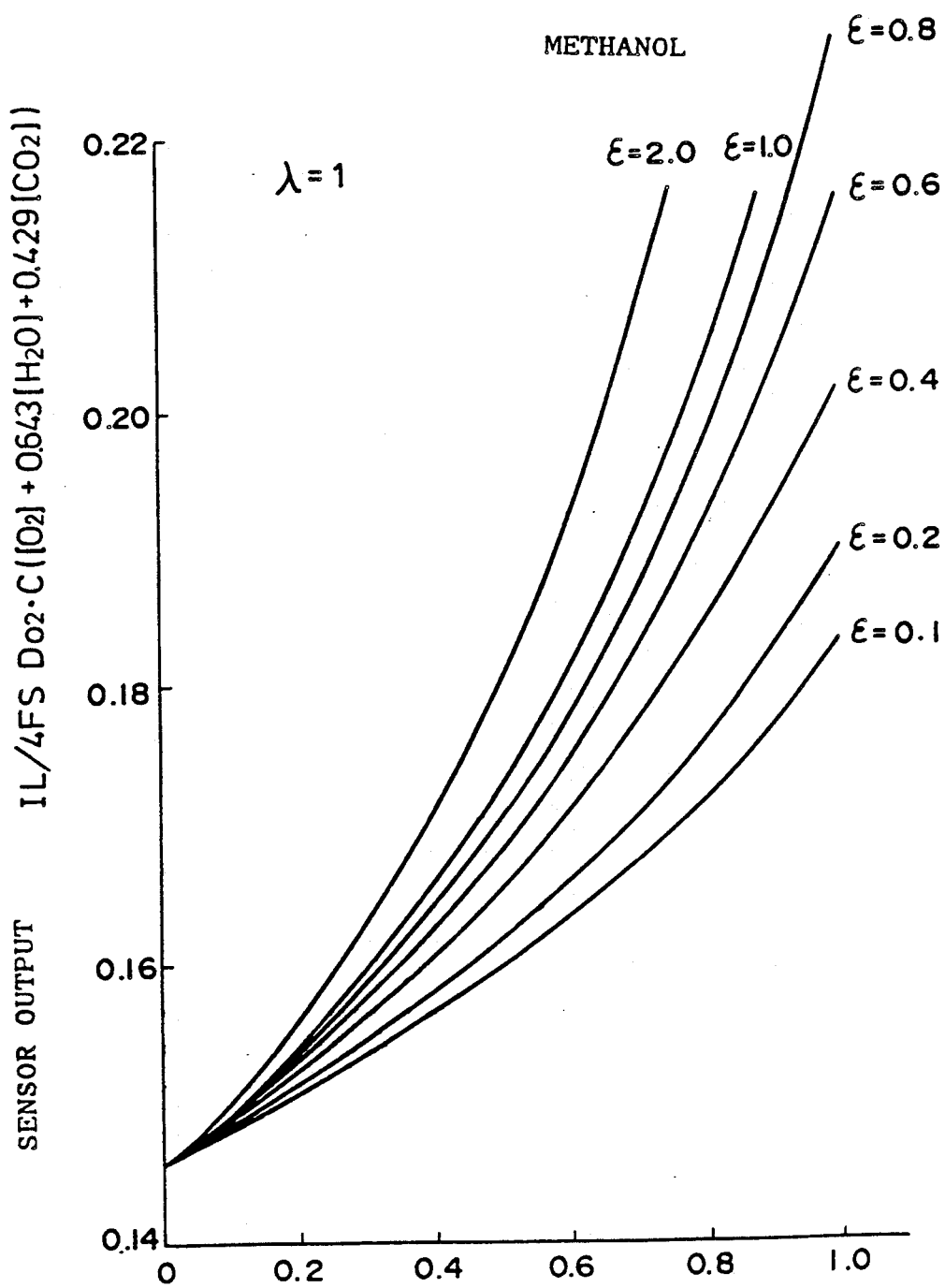
FIG. 10 is a characteristic view showing a relationship between an ethanol mixing ratio and the output from the multicomponent gas sensor.
Figure 11:
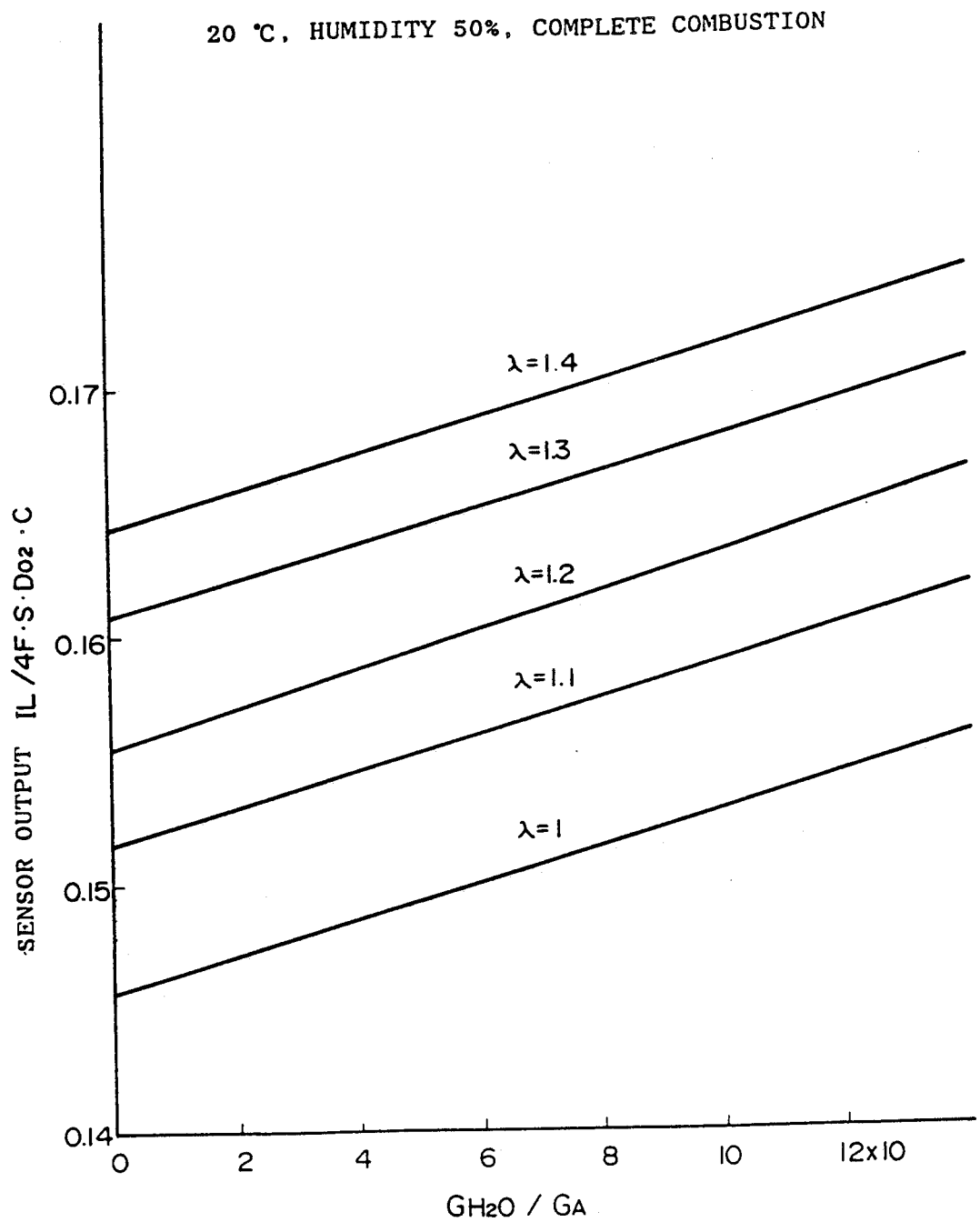
FIG. 11 is a diagram showing a relationship between an amount of water additive and an output from the multicomponent gas sensor.

FIGS. 9 through 11 are such that FIGS. 1 through 3 are obtained from the equation (23) as an output from the multicomponent gas sensor.

Specifically, in FIGS. 9 and 10, a gain is adjusted such that the sensor output is brought to IL/4F·DO₂·S·C, that is, [O₂]+0.643[H₂O]+0.429[CO₂], and a relationship between the sensor output and the mixture ratio a is obtained similarly to FIG. 1. If the air-fuel ratio is controlled such that the air excess ratio λ is brought to a constant value, [O₂] and [CO₂] in the exhaust gas are brought to their respective constant values. Accordingly, the output from the multicomponent gas sensor corresponds to the vapor concentration [$H_2O$]. Thus, similarly to the description with reference to FIG. 1, the air excess ratio $\lambda$ and the atmospheric condition are made constant, whereby it is possible to obtain, from FIGS. 9 and 10, the mixture ratio a of hydrocarbon and alcohol which corresponds to the vapor concentration [$H_2O$]. In this connection, if the relationship between the concentration [$H_2O$] and the mixture ratio a is previously determined or predetermined correspondingly to the atmospheric conditions (P, $P_s$, Z) so that the atmospheric conditions are detected to obtain the mixture ratio a, it is possible to obtain the mixture ratio a highly in accuracy. However, if standard conditions are used as the atmospheric conditions, it is possible to obtain the mixture ratio a which has no problem in practice.

FIG. 11 shows that the sensor output similarly to FIG. 3 in the case of complete combustion at 20° C. and at 50% of humidity, that is, a relationship between the vapor concentration [$H_2O$] and the amount of water $G_{H_2O}/G_A$ is determined in accordance with the air excess ratio $\lambda$. Similarly to FIG. 3, if relationships are determined in various cases such as in case of complete combustion at dry air, in case of 95% of combustion efficiency at dry air and so on, the efficiency is further raised.

FIRST EMBODIMENT

Phase Separation of Known Mixture Ratio of Hydrocarbon and Alcohol

Figure 12:
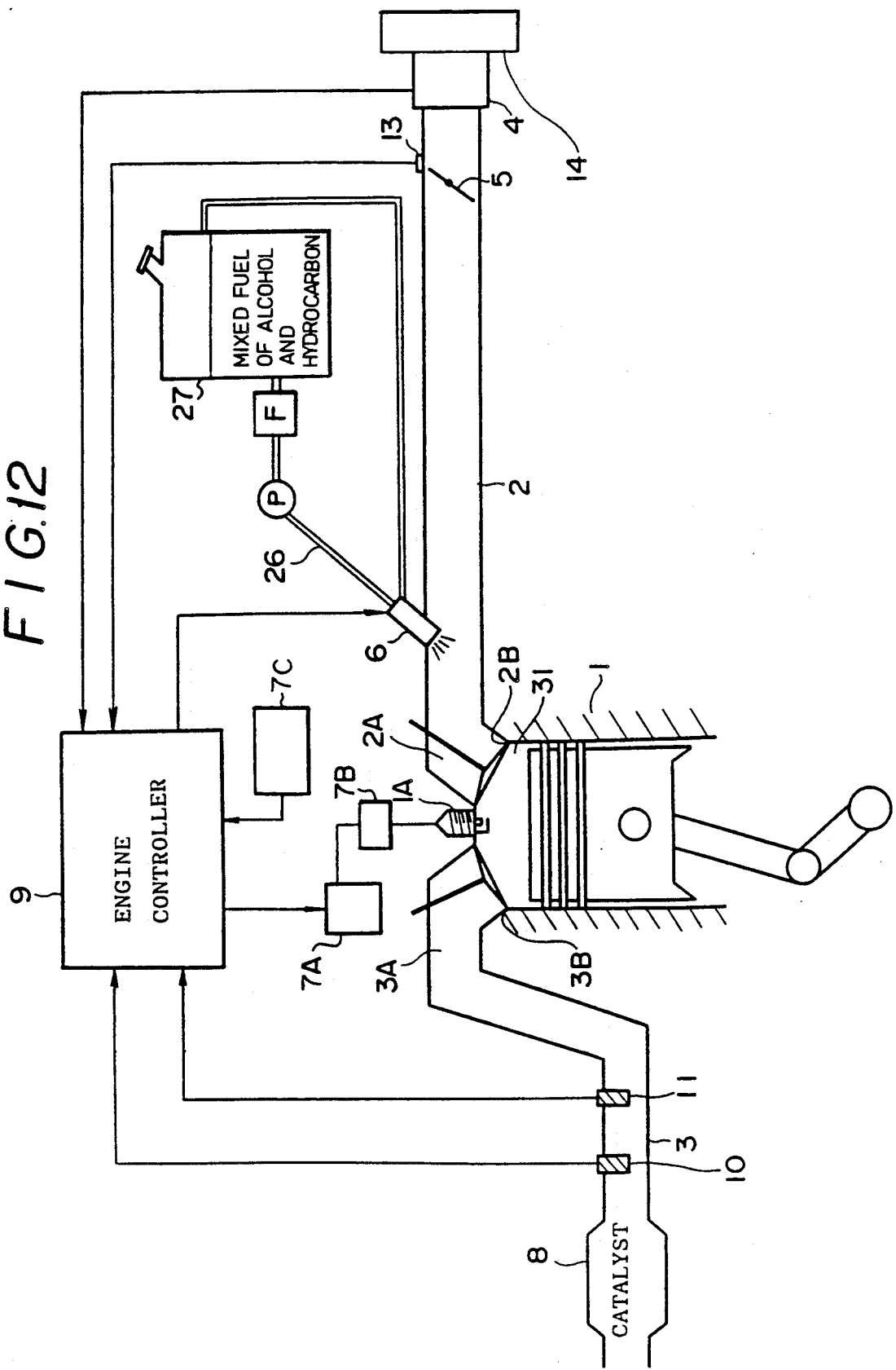
FIG. 12 is a schematic arrangement view of an engine according to a first embodiment of the invention.

A first embodiment of the invention will be described in detail with reference to FIG. 12. FIG. 12 schematically shows a spark-ignition internal combustion engine. An air flow meter 4 is arranged downstream of an air cleaner 14. The air flow meter 4 is constructed by an air flow meter of moving vane type which comprises a compensation plate angularly movably arranged within a damping chamber, a measuring plate fixedly mounted to the compensation plate, and a potentiometer for detecting an amount of suction air from a change in opening of the measuring plate. As the air flow meter, an air flow meter of hot wire type, or an air flow meter of Kármán vortex type may be used. The air flow meter 4 communicates with a suction port 2B of an engine body 1 through a suction passage 2 and an intake manifold 2A. A throttle valve 5 is arranged downstream of the air flow meter 4. The throttle valve 5 has associated therewith a load detector 13 which is turned on when the throttle valve is brought to a condition of a high opening degree. A fuel injecting valve (injector) 6 is arranged at the intake manifold 2A such that the fuel injection valve 6 projects into each parts of cylinder. The fuel injection valve 6 communicates, through a line 26, with a fuel tank 27 in which mixed fuel of alcohol and hydrocarbon is stored. In this connection, P and F in the line 26 represent respectively a pump and a filter.

The intake port 2B communicates with an exhaust passage 3 through a combustion chamber 31 formed within the engine body 1, an exhaust port 3B and an exhaust manifold 3A. The exhaust passage 3 is connected to a catalyst converter 8 in which three-way catalyst is filled. A multicomponent gas sensor 10 for detecting vapor concentration [$H_2O$] and an oxygen concentration sensor ($O_2$-sensor) 11 for outputting a signal inverted as a boundary of a residual oxygen concentration in exhuast gas which corresponds to the stoichiometric air-fuel ratio ($\lambda=1$), are so arranged as to project into the exhaust manifold 3A.

The engine 1 has mounted thereto a spark plug 1A for each cylinder such that the spark plug 1A projects into the combustion chamber 31 of the engine body 1. The spark plug 1A is connected to a control circuit 9 so constructed as to include a microcomputer, through an ignition coil 7B and an ignition module 7A. An engine rotational-speed signal is supplied from a cam-position sensor 7C to the control circuit 9. Further, the relationship between a and the sensor output illustrated in FIG. 9 or 10 is stored in the control circuit 9 in the form of a table.

The operation of the first embodiment will hereunder be described. The control circuit 9 feed-back-controls the fuel injection valve 6 on the basis of the engine rotational-speed signal from the oxygen concentration sensor ($O_2$-sensor) and the cam position sensor 7c and a suction-air-amount signal from the air flow meter 4, such that the air excess rate is brought to a target value (for example, $\lambda=1$). Further, the controller 9 immediately computes a mixture ratio $a=Gf_a/(Gf_a+Gf_1)$ of alcohol and hydrocarbon on the basis of an output from the multicomponent gas sensor 10 under such a condition that the air excess rate is controlled to the target value. In this case, if the alcohol is methanol, the table illustrated in FIG. 9 is used. If the alcohol is ethanol, the table illustrated in FIG. 10 is used. If the computed mixture ratio a considerably differs from a predetermined mixture ratio within the fuel tank 27, the ignition timing and the target value of $\lambda$ are modified or revised. The modification methods are different from each other by their emission reduction types such as three-way catalyst type of $\lambda=1$, lean combustion type of $\lambda>1$, EGR (emission-gas recirculation) type, and so on.

Further, the output from the multicomponent gas sensor 10, which detects the exhaust gas, is integralmeant for a predetermined period of time. $a=Gf_a/(Gf_a+Gf_1)$ corresponding to the integral mean is stored in a memory within the control circuit 9. The mixture ratio is periodically compared with the mixture ratio of the mixing fuel within the fuel tank 27. If a difference between the mixture ratios is remarkably large, this means that a phase separation occurs in the fuel of alcohol and hydrocarbon. According to detection by the multicomponent gas sensor 10 in the system, the mixture rate (mixture ratio) of alcohol can be judged. Thus, an operation $\lambda$ and the ignition timing are controlled and operated in accordance with the alcohol mixing rate. For instance, values are made such that $\lambda$ is made slightly leaner than normal setting and the ignition timing is slightly retarded, accompanied with an increase in the mixture ratio a. Thus, instability and abnormal combustion of the engine are prevented. Moreover, when the output from the multicomponent gas sensor 10 judges the phase separation, homogenization of the mixture is attempted by an agitator (not shown) within the fuel tank 27.

In the first embodiment, if the mixed fuel of alcohol and hydrocarbon is used, the ignition timing and $\lambda$ are feed-back-controlled such that the mixture ratio of alcohol and hydrocarbon is optimized on the basis of the time of combustion. Accordingly, the combustion is stabilized, and torque and specific fuel consumption can be improved. Moreover, a warning may be issued to an operator on the basis of the output from the multicomponent gas sensor 10, or the output from the multicomponent gas sensor 10 may be used as an operational switch of means for homogenizing mixture within the fuel tank 27. Further, if the tables illustrated in FIGS. 9 and 10 are prepared in accordance with the values of $\lambda$, it is possible to cope with various $\lambda$.

SECOND EMBODIMENT

Figure 13:
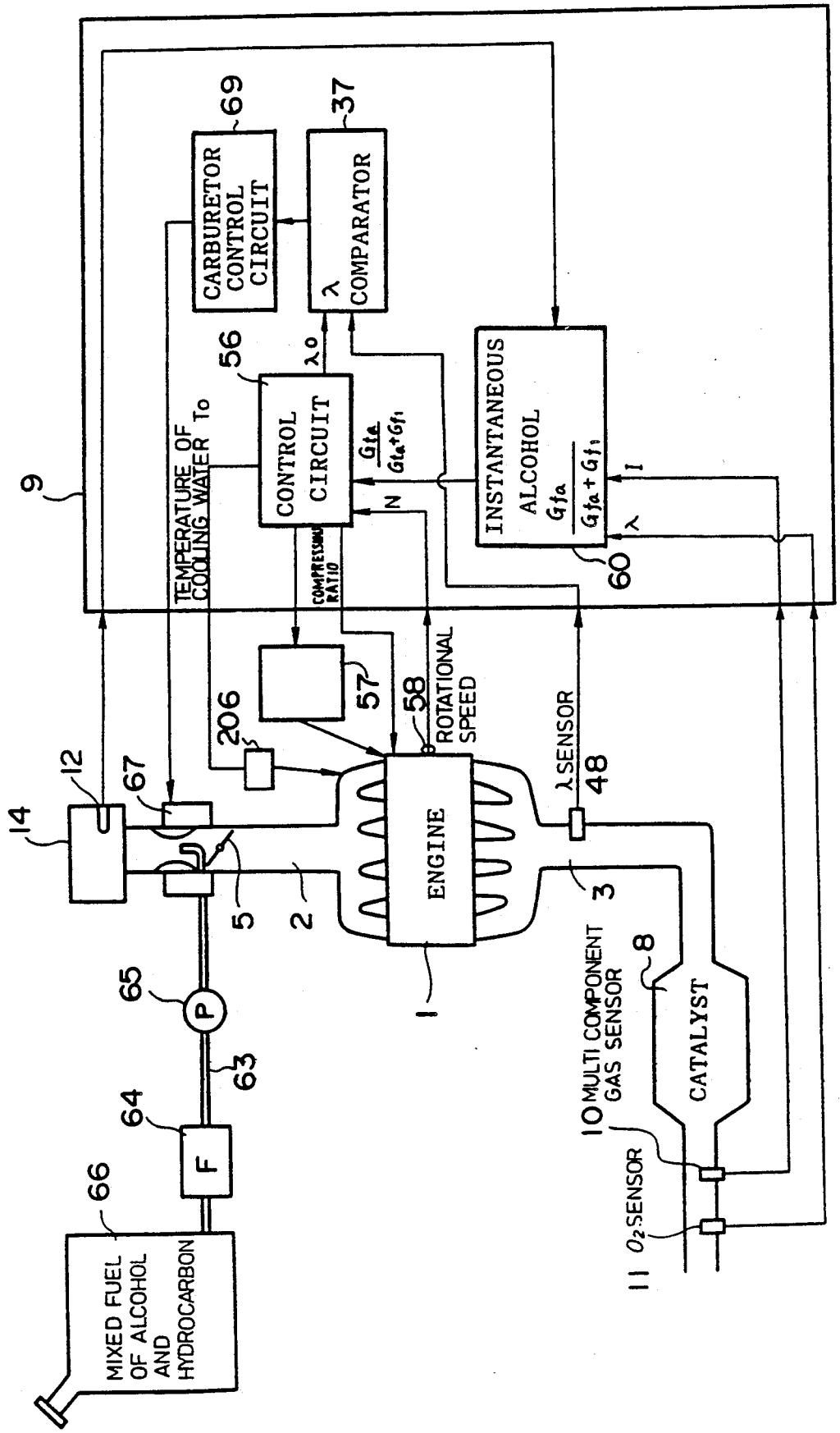
FIG. 13 is a schematic arrangement view of an engine according to a second embodiment of the invention.

Of the systems which use the mixed fuel of alcohol and hydrocarbon, FIG. 13 shows a system in which the mixture ratio a of the mixed fuel is unknown, and the ignition timing, the temperature of the cooling water, the air excess ratio and the compression ratio are so controlled as to agree with the mixture ratio while detecting the mixture ratio. That is, mixed fuel having an optional mixture ratio is stored in a fuel tank 66. A user can optionally select an amount of supply of alcohol (single component) and hydrocarbon fuel (for example, gasoline) in accordance with the fuel circumstances.

To an extreme, an operation is possible from an operation only by alcohol to an operation only by hydrocarbon fuel. The fuel is sent to an electronic-control carburetor 67 from the fuel tank 66 through a passage 63 which is provided with a filter 64 and a pump 65. Mounted to an air cleaner 14 is a multicomponent gas sensor 12 for detecting vapor concentration (or partial pressure) in the atmosphere. An output from the multicomponent gas sensor 12 corresponds directly to $ZP_s$ or $Z \cdot P / _sP$ of the equation (5).

A $\lambda$ sensor ($O_2$-sensor) 48 is mounted at a gathering of the exhaust passage 3 of the engine 1, for detecting $\lambda$ at the engine operation. A multicomponent gas sensor 10 and an $O_2$-sensor 11 are arranged downstream of a catalyst 8, and are used to detect the gas concentration containing $H_2O$ in the exhaust gas. Here, the reason why the sensors correspond respectively to two $\lambda$ of the $\lambda$ sensor 48 and the $O_2$-sensor 11 is that the outputs from the respective sensors 10 and 11 are made correspond to the gas components after complete combustion due to the catalyst, and a sensor is arranged upstream of the exhaust system in order to shorten the control period of the feed-back control of $\lambda$ due to the $\lambda$ sensor 48. If it is considered that the sensors 10 and 11 have their respective surfaces which are high in catalytic activity, the $\lambda$ sensor 48 and the $O_2$-sensor 11 are combined with each other into a single $O_2$-sensor. At this time, the multicomponent gas sensor 10 is transferred to the position of the $\lambda$ sensor 48 upstream of the catalyst. In case where the surfaces of the respective sensors 10 and 11 are high in catalytic activity, it is possible to measure the gas composition after complete combustion, even if the sensors 10 and 11 are not arranged downstream of the catalyst.

When an engine 1 is operated, the signals from the respective sensors 10, 11 and 12 are sent to a processor 60 where the alcohol rate $[Gf_a/(Gf_a+Gf)]$ in the whole fuel supplied to the engine is computed instantaneously. At this time, it is presumed that $\epsilon=0$. This computation is possible by, for example, the equations (2) through (6) and (23). An example of the computation is represented by the curve of $\epsilon=0$ in FIGS. 9 and 10. Further, if the relationship between the outputs from the respective sensors 10 and 11 and $Gf_a/(Gf_a+Gf)$ is experimentally obtained, it is possible to obtain the alcohol rate from the relationship. Moreover, similarly to the first embodiment, the alcohol rate may be obtained from FIG. 9 or 10 and the output from the multicomponent gas sensor.

Figure 14:
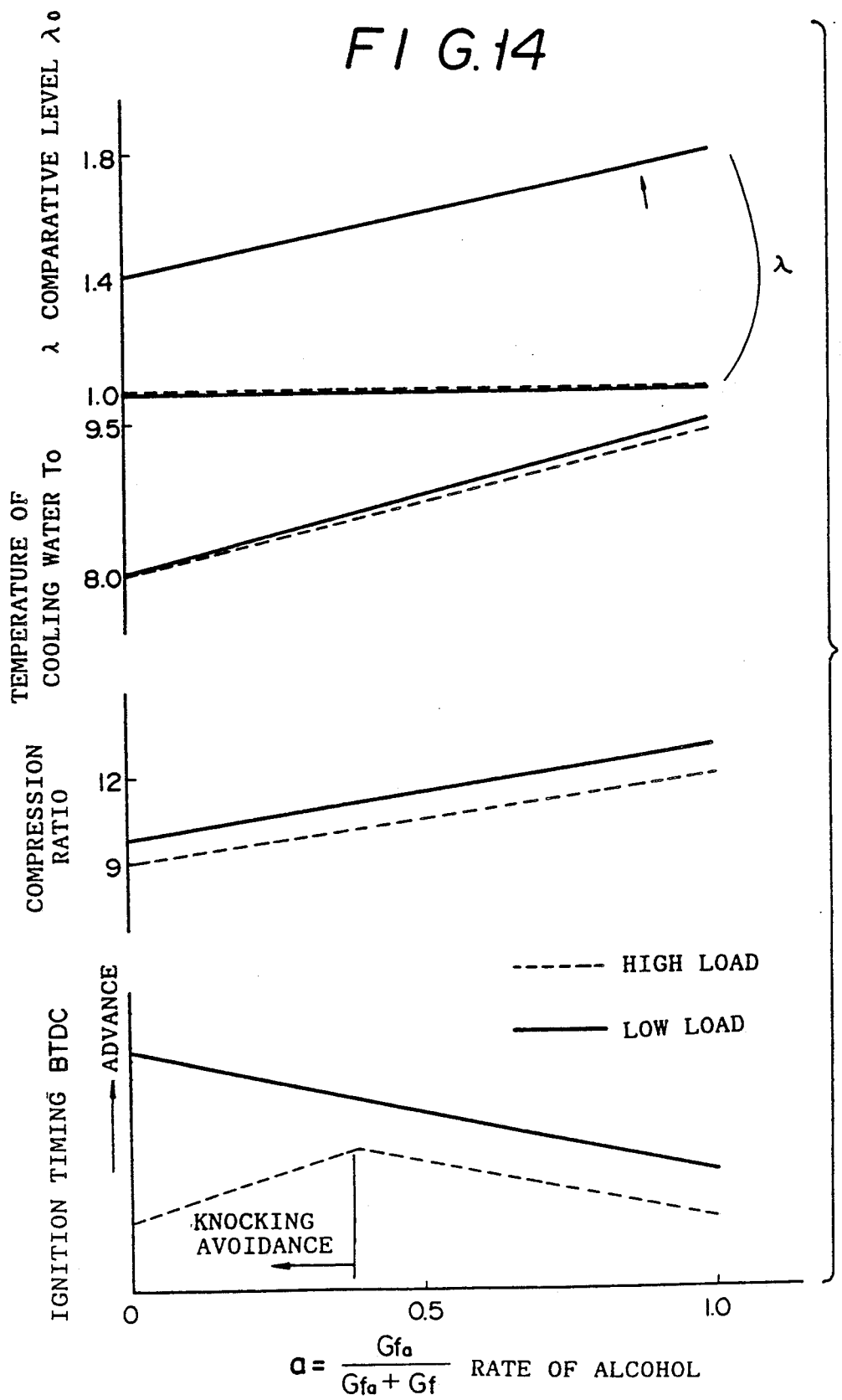
FIG. 14 is a diagram showing a control pattern of the alcohol mixing ratio and ignition timing, a compression ratio, temperature of coolant and a value of a λ comparative level.

The output $Gf_a/(Gf_a+Gf_1)$ from the processor 60 is sent to an engine control circuit 56 where control values of the respective ignition timing, temperature of the cooling water, compression ratio and air excess ratio $\lambda$ are set. These setting values are as illustrated in FIG. 14. The setting is due to the following reasons. That is, the alcohol is faster in burning velocity, larger in vaporization heat, and wider in lean combustion limit than gasoline. Accordingly, in the alcohol mixed fuel, the burning velocity is fast, the vaporization heat is large, and the lean combustion limit is widened, accompanied with an increase in the alcohol rate. Thus, the ignition timing is retarded, $\lambda$ is made lean, the temperature of the cooling water is set to a high temperature, and the compression ratio is improved, in accordance with an increase in the alcohol rate a. However, this control tendency is required to be slightly changed in accordance with the load on the engine, because of difference in thermal load. Particularly, since an output power is required under a heavy load, knocking tends to occur in the vicinity of $\lambda=1$ or in accordance with an increase in the gasoline rate in the mixed fuel. Thus, the ignition timing must be retarded in a range in which knocking tends to occur.

Figure 15:
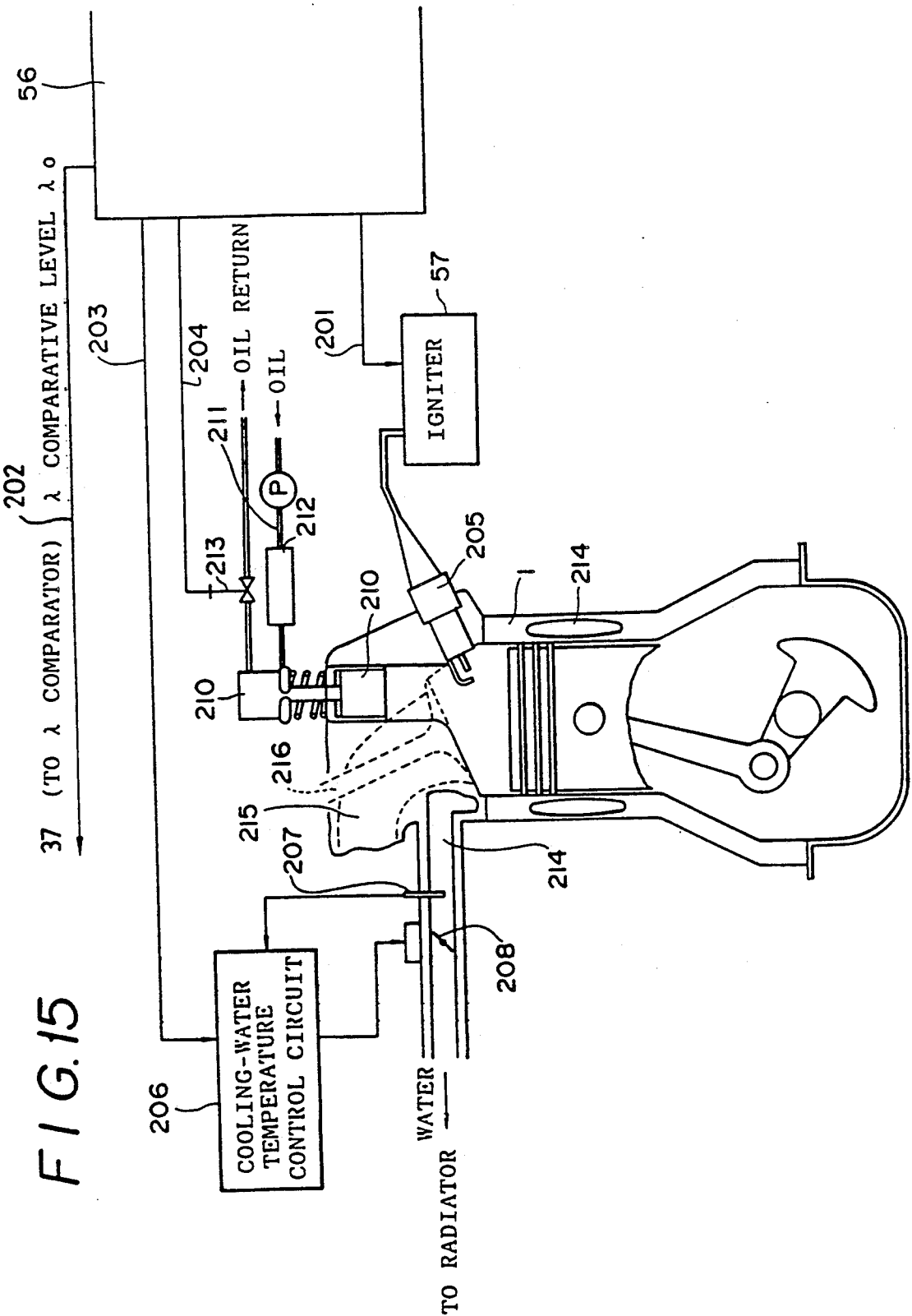
FIG. 15 is a view for explanation of a command of a control circuit and connection between a plurality of actuators.

FIG. 15 is a view showing in detail connection between each actuator and the control circuit 56 illustrated in FIG. 13. In the control of $\lambda$, a target value $\lambda_0$ of $\lambda$ set in the control circuit 56 is sent to a comparator 37 through a signal line 202. The comparative result $(\lambda - \lambda_0)$ is sent to a carburetor control circuit 69 (FIG. 13), where the carburetor 67 is controlled such that the air excess ratio is brought to $\lambda_0$.

A cooling-water temperature setting value $T_0$ is sent to a coolant temperature control circuit 206 through a signal line 203. In the coolant temperature control circuit 206, the coolant temperature at an outlet of the engine 1 or the coolant temperature at an inlet thereof is detected by a thermocouple 207, and a flow control valve 208 is feed-back-controlled on the basis of the comparative result of the setting value $T_0$ and detected temperature T of the thermocouple 207. Thus, flow rate of the coolant is controlled such that an output from the thermocouple 207 is brought to the setting value $T_0$.

An ignition-timing signal is sent to an igniter 57 through a signal line 201 and, correspondingly to this, spark discharge and ignition are made at a spark plug 205. A compression ratio can be changed by a hydraulic variable compression-ratio unit 210 which is disclosed in Japanese Unexamined Publication No. SHO 60-75728. The hydraulic pressure is generated by an oil pump 211 and a one-way valve (check valve) 212. A control valve 213 on the oil return side is operated in accordance with an output from the control circuit 56 to operate an auxiliary piston in the variable compression-ratio unit, thereby adjusting the compression ratio.

Here, the reference numrals 214, 215 and 216 designate a water jacket, a suction port and a suction valve, respectively. An exhaust port and an exhaust valve the not shown, because they are located on the front side of the cross-sectional view.

THIRD EMBODIMENT

Two-Systematic Supply of Hydrocarbon and Alcohol

Figure 16:
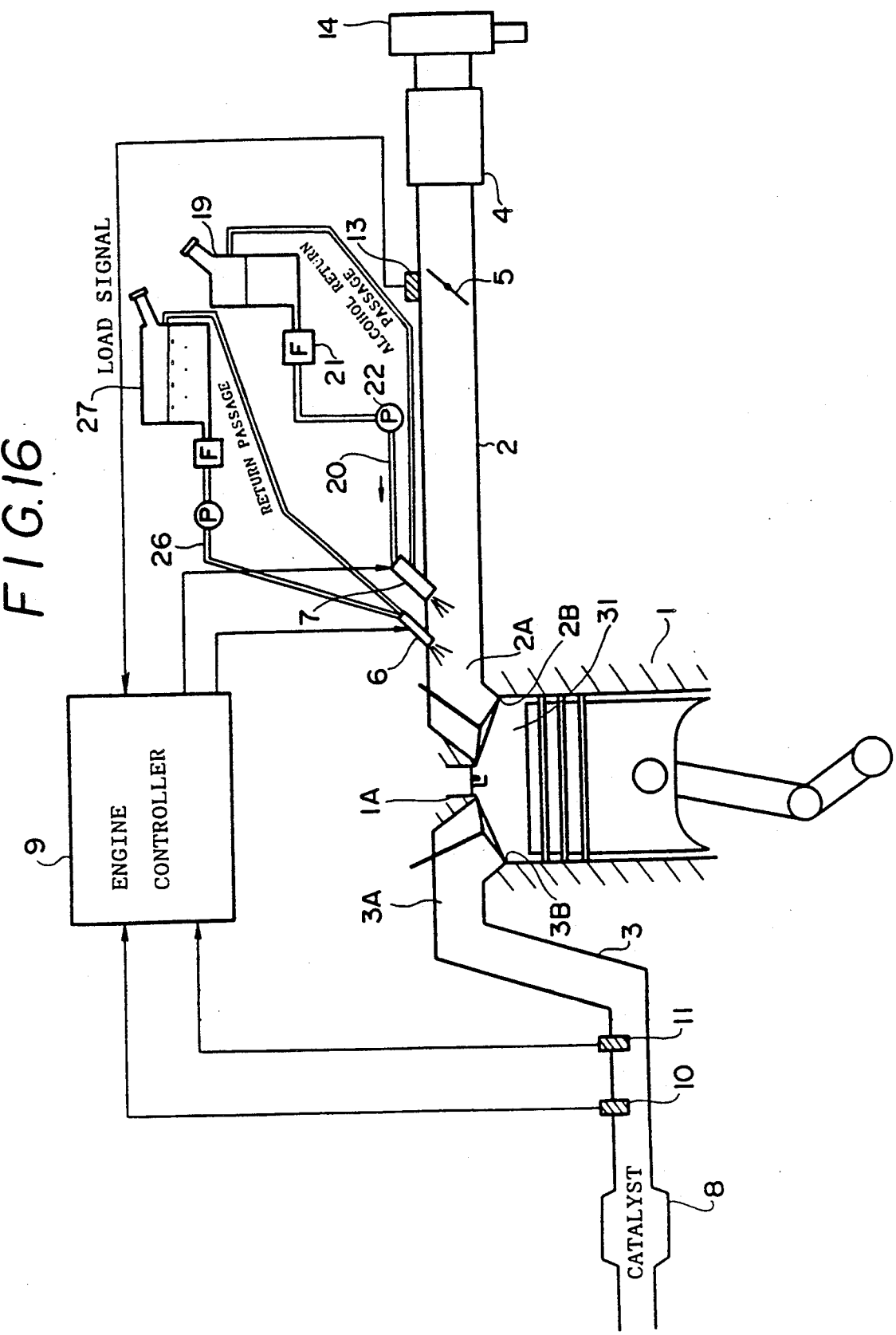
FIG. 16 is a basic systematic view of supply of alcohol addition according to a third embodiment of the invention.

A third embodiment of the invention will be described in detail with reference to FIG. 16. The embodiment is such that alcohol is supplied as cooling liquid at a high load. FIG. 16 schematically shows a spark ignition internal combustion engine. An air flow meter 4 is arranged downstream of an air cleaner 14. The air flow meter 4 communicates with a suction port 2B of an engine body 1 through a suction passage 2 and an intake manifold 2A. A throttle valve 5 is arranged downstream of the air flow meter 4. The throttle valve 5 has associated therewith a load detecting switch 13 which is turned on when the throttle valve 5 is brought to a condition of a high opening degree. The intake manifold 2A has arranged thereat a fuel injection valve (injector) 6 such that the fuel injection valve 6 projects into parts of each cylinder. The fuel injection valve 6 communicates, through a line 26, with a fuel tank 27 in which hydrocarbon fuel is stored or accumulated. Arranged upstream of the fuel injection valve 6 is an alcohol supply valve 7 which communicates with an alcohol tank 19 through a line 20. A filter 21 and a pump 22 are interposed in the line 20.

The suction port 2B communicates with an exhaust passage 3 through a combustion chamber 31, an exhaust port 3B and an exhaust manifold 3A. The exhaust passage 3 is connected to a catalytic converter 8 in which three-way catalyst is filled. A multicomponent gas sensor 10 and an oxygen concentration sensor 11 for outputting a signal corresponding to residual oxygen concentration in exhaust gas which corresponds to the air excess ratio $\lambda=1$, are so arranged as to project into the exhaust manifold 3A.

A spark plug 1A is mounted to the engine body 1 for each cylinder such that the spark plug 1A projects into the combustion chamber 31 of the engine body 1. The spark plug 1A is connected to a control circuit 9 so constructed as to include a microcomputer, through a distributor and an igniter (both not shown).

The operation of the third embodiment will be described.

When the engine is operated at a high load, a signal is outputted from the load detector 13, and supply of alcohol is started in response to this signal. That is, at a low load, the engine is operated at a predetermined $\lambda$ (for example, $\lambda=1$) with the hydrocarbon fuel by the output from the O$_2$-sensor 11. When the load is brought to high one, however, alcohol injection is started. When the alcohol injection is started, an engine controller feed-back-controls the hydrocarbon supply such that the hydrocarbon supply is automatically reduced, in order to maintain $\lambda$ constant. Further, the air excess ratio $\lambda$ detected by the oxygen sensor 11 is computed, and a target value $a_0$ of the alcohol mixture rate $a=Gf_a/(Gf_a+Gf_1)$ is computed using the equations (2) through (6) and (11) through (13). An amount of alcohol supply is feed-back-controlled by the controller 9 on the basis of the output from the multicomponent gas sensor 10 and the table shown in FIG. 9 or 10 such that the alcohol mixing rate is brought to the target value $a_0$. Normally, it is possible to control highly accurate $\lambda$ and the alcohol mixing rate by this control system.

Values for obtaining, as $\lambda=1$, vaporization hat equal to vaporization heat of the surplus hydrocarbon fuel of the conventional engine, using alcohol fuel, are revealed in tables 1 and 2. In this connection, in the tables 1 and 2, the vaporization heat is expressed by the mixture ratio $Gf_a/Gf_1$ between the alcohol fuel and the hydrocarbon fuel. If the vaporizing heat is converted into the above-described target value $a_0$, there is obtained $a_0/(1-a_0)$. Further, meaning of symbols in the tables 1 and 2 is as follows:

$Gf_1$: an amount of supply (mass flow rate) of hydrocarbon fuel at the time alcohol is added;

$Gf_a$: an amount of addition of alcohol (mass flow rate);

$A/F_{st}$: 14.0 to 15.2 of a stoichiometric air-fuel ratio of hydrocarbon fuel;

$A/F_{sta}$: a stoichiometric air-fuel ratio of alcohol fuel;

$A/F$: normally 8 to 13 of an air-fuel ratio at a high load which is required at supply of only hydrocarbon fuel;

$\lambda$: an air excess ratio;

$$\lambda = \frac{G_A}{A/F_{st} \cdot Gf_1 + A/F_{sta} \cdot Gf_a}$$

where $G_A$ is a suction amount.

$H_{co}$: a calorific value of the conventional engine; and $H_c$: a calorific value of the engine according to the embodiment.

As described above, the alcohol mixing ratio a corresponds to the mixture ratio $Gf_a/Gf_1$ of alcohol and hydrocarbon. Accordingly, the mixture ratio $Gf_a/Gf_1$ may be controlled on the basis of the output from the multicomponent gas sensor.

Figure 17:
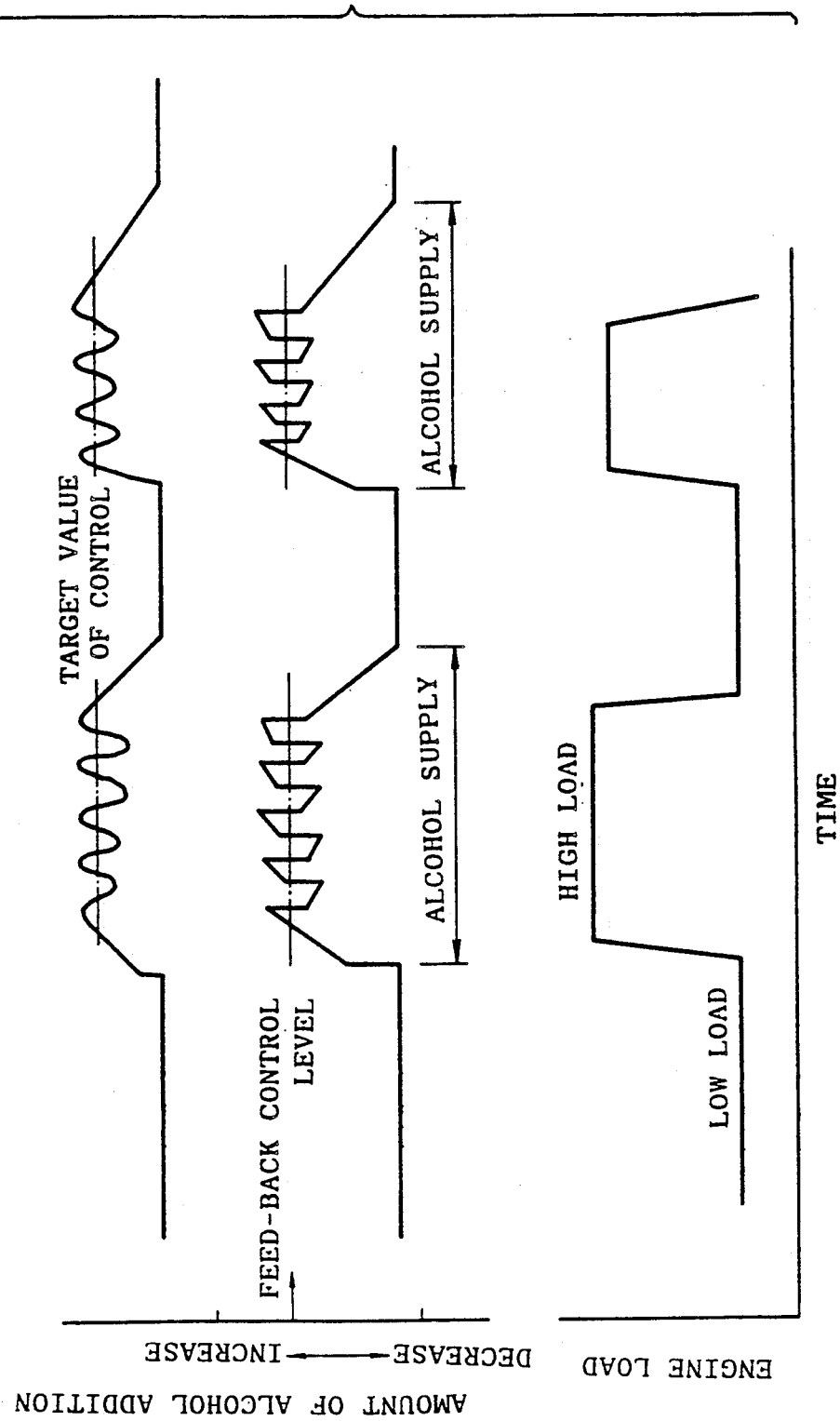
FIG. 17 is a time chart showing an example of feedback control of alcohol additive supply.

FIG. 17 is a view for explanation of a method of controlling the mixture ratio $Gf_a/Gf_1$ on the basis of the output from the multicomponent gas sensor in the exhaust gas to optimally supply the alcohol. In order to feed-back-control the amount of alcohol supply $Gf_a$ on the basis of the output from the multicomponent gas sensor, the amount of alcohol supply fluctuates centering around the target value. In this figure, the feed-back signal is PI-controlled (proportional-and-integral-controlled).

In the third embodiment, the multicomponent gas sensor and the $\lambda$ sensor are utilized to always detect the amount of alcohol addition and supply on the basis of the output from the multicomponent gas sensor 10 in the exhaust gas, thereby acting so as to do the feed-back control. Accordingly, thre are the following advantages. That is, the alcohol supply ratio os remarkably high in accuracy as compared with the conventional system, and control can be done which concentrates upon the control target value. Further, by combination with the $\lambda$ contol, the mixture ratio and the air excess ratio are determined with accuracy, and optimization and stability of combustion are remarkably made easy as compared with the conventional system. As a result, a remarkable improvement in the thermal efficiency at supply of alcohol is made possible.

FOURTH EMBODIMENT

Water Absorption Ratio of Alcohol

A fourth embodiment will next be described with reference to FIG. 18, in which pure alcohol fuel is used as fuel. The embodiment is such that a water absorption ratio of alcohol is detected, and an engine is controlled on the basis of the detected water absorption ratio. In this connection, the engine is similar in construction to that illustrated in FIG. 12, and the description of the engine will be omitted.

The engine uses, as fuel, pure alcohol fuel in place of the mixed fuel of hydrocarbon and alcohol. In the engine, $Gf_a/(Gf_a+Gf_1)=1$. Thus, a water content (water absorption ratio), $\epsilon$ of alcohol is computed on the basis of $\lambda$ due to an O$_2$-sensor 11, an output from a multicomponent gas sensor 10 and the table illustrated in FIG. 9 or 10, so that $\lambda$ and ignition timing are feed-back-controlled. For instance, in an engine whose standard is lean combustion of $\lambda>1$, a change in sensor output from $\epsilon=0$ to $\epsilon>0$ causes a lean combustion limit of the engine to be transferred to the rich side. Accordingly, a target value of $\lambda$ is enriched in agreement with $\epsilon$, and combustion of the engine is stabilized. Further, in a three-way catalytic system of $\lambda=1$, a change in sensor output from $\epsilon=0$ to $\epsilon>0$ causes burning velocity to be lowered. Accordingly, the ignition timing is advanced from MBT ignition timing of $\epsilon=0$ to MBT ignition timing of its owm $\epsilon$.

Further, if the pure alcohol is used as the fuel, water content in the alcohol is detected so that combustion is optimally contolled. Thus, thermal efficiency can be improved.

FIG. 18 shows a system in which fuel being pure alcohol or having a known mixture ratio of alcohol and hydrocarbon is used to control optimum combustioin. The system is entirely the same as that illustrated in FIG. 13 except for an interior of a controller 9, a filter 42, a pump 43, an alcohol passage 44 and a fuel system of an alcohol tank 46. The description of the same components will be omitted. Only different components will principally be described below.

In the arrangement, $Gf_a/(Gf_a+Gf_1)$ can be considered constant. Fuel is accumulated in the tank 46. Here, since alcohol absorbs moisture and so on in the atmosphere, it is impossible to ignore a water absorption ratio $\epsilon$ in control of an internal combustion engine. The fuel is sent to a carburetor through the filter 42, the line 44 and the pump 43.

Figure 19:
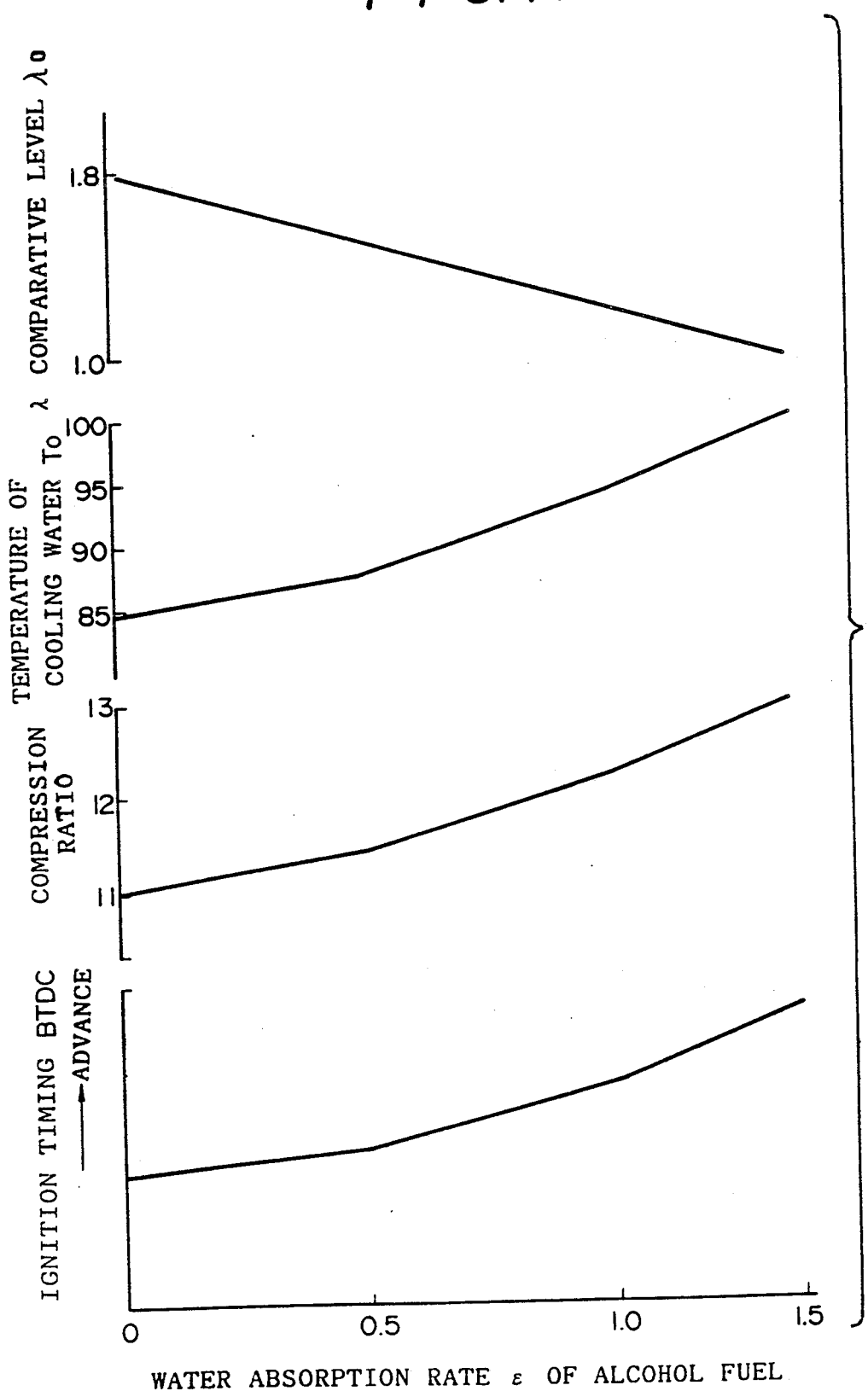
FIG. 19 is a control pattern of ignition timing, a compression ratio, temperature of coolant and a value of λ comparative level with respect to a moisture water dissolution ratio ε in alcohol.

Outputs from the respective multicomponent gas sensor 10 and $O_2$-sensor 11 and an atmospheric humidity output from a multicomponent gas sensor 12 are sent to a circuit 71 in which the ratio (water absorption ratio) $\epsilon$, water content in alcohol, is computed. This can be computed as illustrated in FIGS. 9 and 10 by the equations (2) through (6) and (23). Further, this computation may rely upon the map illustrated in FIG. 9 or 10 on the basis of experiment. The water absorption ratio $\epsilon$ is sent to a control circuit 56 to adjust a $\lambda$ comparative level $\lambda_0$, ignition timing, a compression ratio and temperature of coolant water in agreement with the water absorption ratio $\epsilon$. FIG. 19 shows a control pattern with respect to the water absorption ratio $\epsilon$ in the alcohol. As the water absorption ratio $\epsilon$ increases, there is such a tendency that the burning velocity is reduced, the vaporization heat is increased, and the lean combustion limit is reduced. Further, knocking ceases to occur. Thus, accompanied with an increase in the water absorption ratio $\epsilon$, the ignition timing is advanced, the compression ratio is raised, the temperature of coolant is raised, and the comparative level $\lambda_0$ of $\lambda$ is set to a smaller value, thereby attempting to an improvement in performance. Connection to actuators is the same as that illustrated in FIG. 15.

FIFTH EMBODIMENT

Water Addition Supply

Figure 20:
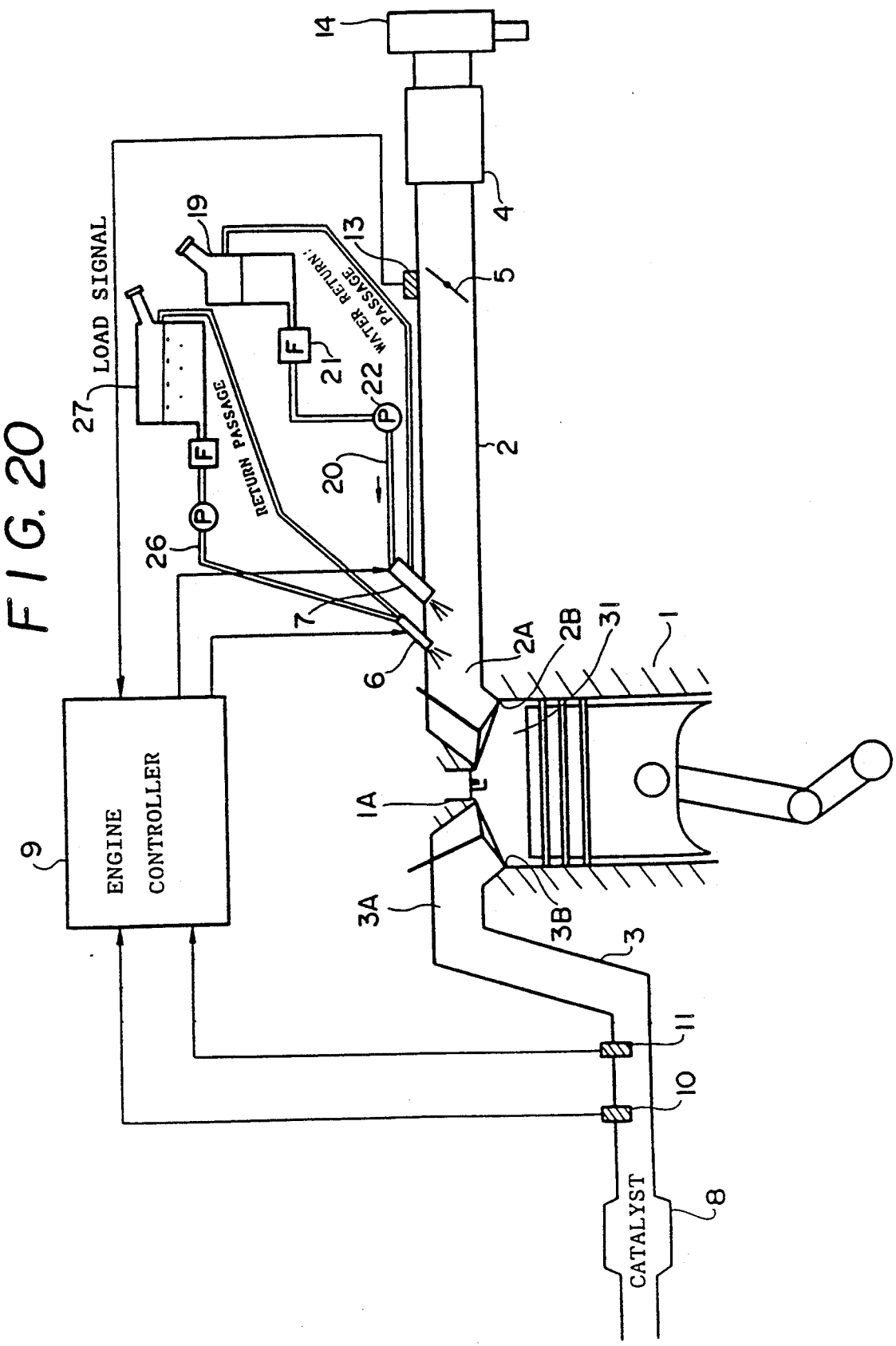
FIG. 20 is a basic systematic view of a water additive supply according to a fifth embodiment of the invention.

A fifth embodiment of the invention will be described in detail with reference to FIG. 20. FIG. 20 schematically shows a spark ignition internal combustion engine. An air flow meter 4 is arranged downstream of an air cleaner 14. The air flow meter 4 communicates with a suction port 2B of an engine body 1 through a suction passage 2 and an intake manifold 2A. A throttle valve 5 is arranged downstream of the air flow meter 4. The throttle valve 5 has associated therewith a load detector 13 which is turned on when the throttle valve is brought to a condition of a high opening degree. Arranged at the intake manifold 2A is a fuel injection valve (injector) 6 such that the fuel injection valve 6 projects into parts of each cylinder. The fuel injection valve 6 communicates with a fuel tank 27 through a line 26. A water supply valve 7 is arranged upstream of the fuel injection valve 6, and communicates with a water tank 19 through a water line 20. A filter 21 and a pump 22 are interposed in the water line 20.

The suction port 2B communicates with an exhaust passage 3 through a combustion chamber 31 formed in the engine body 1, an exhaust port 3B and an exhaust manifold 3A. The exhaust passage 3 is connected to a catalytic converter 8 in which three-way catalyst is filled. A multicomponent gas sensor 10 and an $O_2$-sensor 11 for outputting fa signal representative of residual oxygen concentration in exhaust gas corresponding to a stoichiometric air-fuel ratio ($\lambda=1$) are so arranged as to project into the exhaust manifold 3A.

A spark plug 1A is mounted to the engine body 1 for each cylinder such that the spark plug 1A projects into the combustion chamber 31 of the engine body 1. The spark plug 1A is connected, through a distributor and an igniter (both not shown), to a control circuit 9 which is so constructed as to include a microcomputer or computing processor.

The operation of the fifth embodiment will be described below.

When the engine is operated at an intermediate or light load, $\lambda$ is detected by the $O_2$-sensor 11, and an amount of fuel supplied from the injection valve 6 is feed-back-controlled so as to be brought to a predetermined air excess ratio $\lambda$ (for example, $\lambda=1$). At this time, water is not supplied. When the engine is operated at a heavy load, the controller starts supply of water by a load signal from the load detector 13 which is interlocked with the throttle valve 5 and which is turned on when the throttle valve 5 is brought to its high opening degree (heavy load). In this connection, the load detector 13 may be incorporated in the air flow meter 4.

Water is delivered by the pump 22 from the water tank 19 into the water passage 20 through the filter 21, and is injected into the suction passage 2 from the water supply valve 7. An amount of injected water appears as concentration of $H_2O$ (vapor concentration) in the exhaust gas. The vapor concentration is detected by the multicomponent gas sensor 10 which is mounted on the exhaust pipe. The amount of water supply computes comparative current $I_0$ on the basis of the equations (2) through (5), (17) and (23), of the output $\lambda$ from the $O_2$-sensor 11 and a control target value of the amount of water $GH_2O/G_A$ added per unit mass of suction air. The comparative current $I_0$ is compared with the output from the multicomponent gas sensor 10, to feed-back-control an increase or a decrease in the water supply. In this connection, the comparative current $I_0$ can also be obtained from the table illustrated in FIG. 11 on the basis fo the control target value and the air excess ratio $\lambda$.

Figure 21:
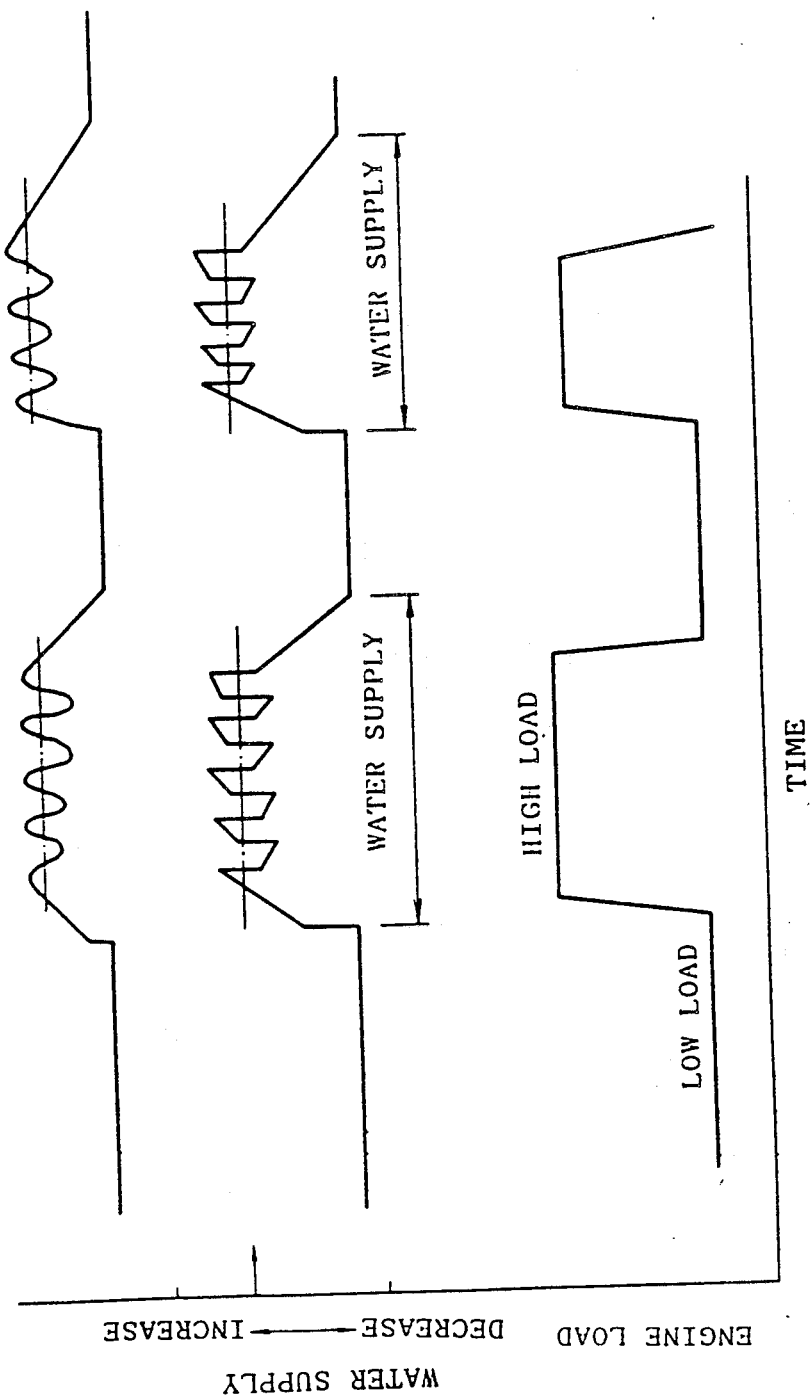
FIG. 21 is a diagram showing an example of feedback control of a water additive supply.

The control target value varies dependent upon the atmospheric humidity and the combustion efficiency. However, the control target value is detected by an atmospheric-humidity sensor or is corrected by the output from the multicomponent gas sensor 10 under the condition of non-water supply. Further, an amount of supply of the hydrocarbon fuel is feed-back-controlled such that $\lambda$ is detected by the $O_2$-sensor 11 and is brought to a predetermined $\lambda \geq 1$. FIG. 21 shows an example of the feed-back control of the water supply. When the load of the engine is high, supply of water is started. An amount of injection is raised more than the control target value and, hereinafter, an increase and a decrease of the amount of injection are repeated on the basis of detection of the output from the multicomponent gas sensor 10. The amount of injection fluctuates with a certain response delay, around a target value. This example is such that the feed-back signal is PI-controlled, i.e., is proportional-and-integral-controlled.

In the system, the target value of the water supply is computed with vaporizing heat of water substituted for vaporization heat of the hydrocarbon fuel supplied in a surplus manner to the system at the heavy load of an engine before remodeling. The target value of the water supply is within the following range:

$$1.01 \times 10^2 \geq \frac{GH_2O}{G_A} \geq 7.2 \times 10^{-4}$$

By the feed-back control, accuracy of the water supply control can remarkably be improved.

The fifth embodiment is such that, at a heavy load, the hydrocarbon fuel is feed-back-controlled to the predetermined $\lambda$ that is $\lambda \geq 1$ with accuracy, and the output from the multicomponent gas sensor corresponding to $H_2O$ in the exhaust gas is detected to feed-back-control the water supply optimum for cooling within the cylinder. Accordingly, the fifth embodiment brings a remarkable improvement in specific fuel consumption and a remarkable improvement in brake torque, as compared with the conventional engine which does not use the system. As a heavy load signal is issued from the load signal detector 13, the conventional engine supplies a plenty of fuel of $\lambda < 1$. In the present system, however, the water supply valve 7 starts water supply in response to the heavy load signal from the load signal detector 13. Thus, $\lambda$ can be maintained to an optimum value which is equal to or higher than 1. At a heavy load, the conventional engine releases the feed-back-control of the $O_2$-sensor to show an abrupt increase in the fuel flow of $\lambda < 1$. To the contrary, in the system, the feed-back control using the $O_2$-sensor 11 maintains $\lambda$ to the optimum fuel supply at a constant or predetermined value that is equal to or above 1, regardless of the load. On the other hand, the water supply computes the comparative level $I_0$ of the current by the comparative level computer within the controlled, of the output from the $O_2$-sensor 11 and the amount of optimum water supply. The comparative level $I_0$ is compared with the output from the multicomponent gas sensor 10. Control for increasing or decreasing the amount of water supply is done within the controller 9. Water supply in accordance with this command is done by the water injection valve 7. Thus, the water supply can be brought to the vicinity of the optimum value. Accordingly, the thermal load of the engine does not increase even at the heavy load, and the operation due to the optimum ignition timing having no knocking can be done. Thus, the specific fuel consumption can be improved and the output power can be improved. The improvement in the specific fuel consumption varies dependent upon engines within a range of 10% to 50%. Moreover, HC emission is also lowered.

Figure 22:
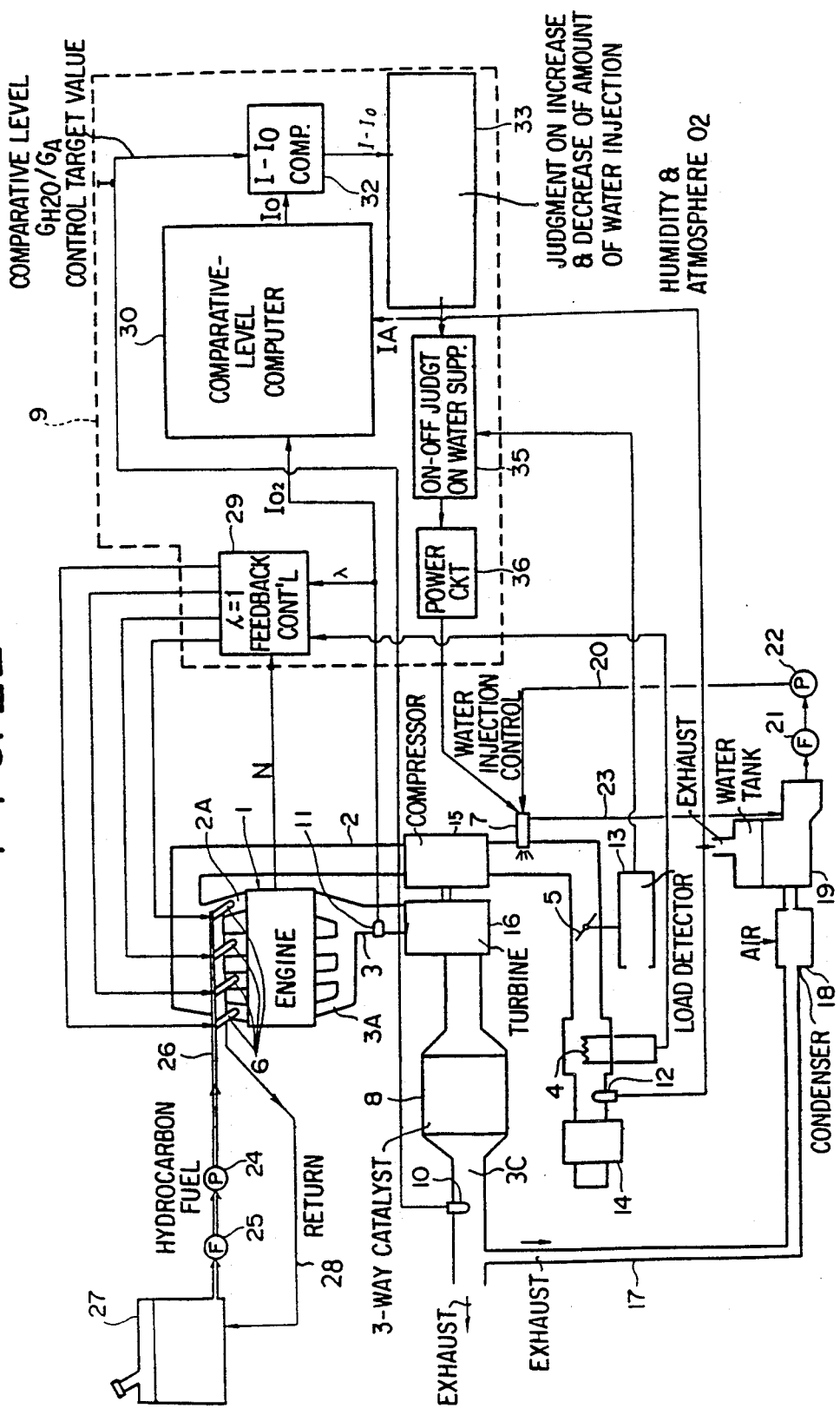
FIG. 22 is a systematic view of a control target value which is converted into a current value to directly compare with a sensor signal.

FIG. 22 shows a system in which computation is done for converting and modifying the control target value to I in order to directly compare the sensor signal in the above-described fifth embodiment. In this connection, components and parts similar to those of the fifth embodiment are designated by the same reference numerals, and the description of the similar components and parts will therefore be omitted.

In an engine having the arrangement, a multicomponent gas sensor 12 on the suction side is arranged downstream of an air cleaner 14 in a suction passage 2. In this embodiment, a load detector 13 is interlocked with a throttle valve 5 so that it is possible to detect a load.

This system is a gasoline engine of turbocharger type which has a turbine 16 in an exhaust system and a compressor 15 in a suction system. A fuel system is constructed such that a filter 25, a pump 24, a plurality of injection valves 6 and a fuel tank 27 are connected to each other through a line 26 and a return passage 28. The fuel system is controlled by a fuel feed-back control circuit within a control circuit 9. On the other hand, a water supply system is constructed such that a water tank 19, a filter 21, a water pump 22 and a water injection valve 7 are connected to each other through a water line 20 and a return passage 23. This system takes such a system that a part of exhaust gas from an exhaust pipe 3C downstream of a three-way catalyst 8 is introduced into a heat exchanger 18 through a bypass passage 17, and condensed water in the exhaust gas, which is cooled substantially to the atmospheric temperature, is accumulated in the heat exchanger 18 (condensere). A load of the engine is detected by the load detector 13 which is interlocked with the suction throttle valve 5. A suction system comprises the air cleaner 14, the humidity sensor (multicomponent gas sensor) 12 in the atmosphere, the air flow meter 4, the throttle valve 5, the compressor 15 and the suction passage 2. The water injecting valve 7 is arranged immediately upstream from the compressor 15, and the fuel injection valves 6 are arranged immediately in front of the respective suction valves. This arrangement is provided for cooling the compressor by means of water supply and for atomizing liquid droplets within the compressor. An exhaust system is composed of an exhaust pipe 3. A $\lambda$ sensor ($O_2$-sensor) 11 is arranged upstream of the turbine 16, and a multicomponent gas sensor 10 is arranged downstream of the catalyst 8. This arrangement is provided for causing the $\lambda$ sensor 11 to approach the engine in order to improve the response ability of the fuel feed-back control, and for arranging the multicomponent gas sensor downstream of the catalyst to obtain an output from the multicomponent gas sensor which corresponds to compositions after substantially complete combustion due to the catalyst. Further, since humidity ($H_2O$ concentration in the atmosphere) can be measured by the multicomponent gas sensor 12 from the suction system, control can be done on the basis of these three signals such that $\lambda$ in the exhaust gas and the atmospheric humidity are corrected. In a $\lambda = 1$ fuel feed-back control circuit 29 within the controller 9, an amount of fuel supply is controlled on the basis of rotational speed N, the air flow meter 4 and the feed-back signal from the $\lambda$ sensor 11.

The operation will be described.

An output $I_0$, in which an amount of water addition $GH_2O/G_A$ is corrected by the atmospheric humidity and $\lambda$, is computed on the basis of an output $I_{O2}$ detected by the $\lambda$ sensor 11 and an output $I_4$ from the multicomponent gas sensor 12 in the suction air within a comparative level computer 30. The computed output $I_0$ is set to a comparator 32. Since water due to the atmospheric humidity and water from the tank are supplied to the combustion chamber, an amount of water injected from the water injection valve 7, that is, the comparative level $I_0$ is reduced less than the optimum amount of water supply correspondingly to the atmospheric humidity. On the other hand, the output I from the multicomponent gas sensor 10 is sent to the comparator, and $I-I_0$ is outputted to an increase/decrease judging unit 33 of an amount of water injection.

Here, if $I-I_0$ is negative, the amount of injection of the water injection valve 7 is controlled in an increase direction. If $I-I_0$ is positive, the amount of the injection is controlled in a decrease direction. This output is sent to a unit 35 for judging whether the water supply is done or stopped on the basis of the output from the load detector 13. In the unit 35, the load detector is turned on only when the signal is brought to a heavy load signal, so that a signal is outputted to a power circuit 36 from the unit 35. Thus, the water injection valve 7 is controlled in driving. By this feed-back, the water supply fluctuates within a small range, centering substantially around the optimum value $GH_2O/G_A$.

Figure 23:
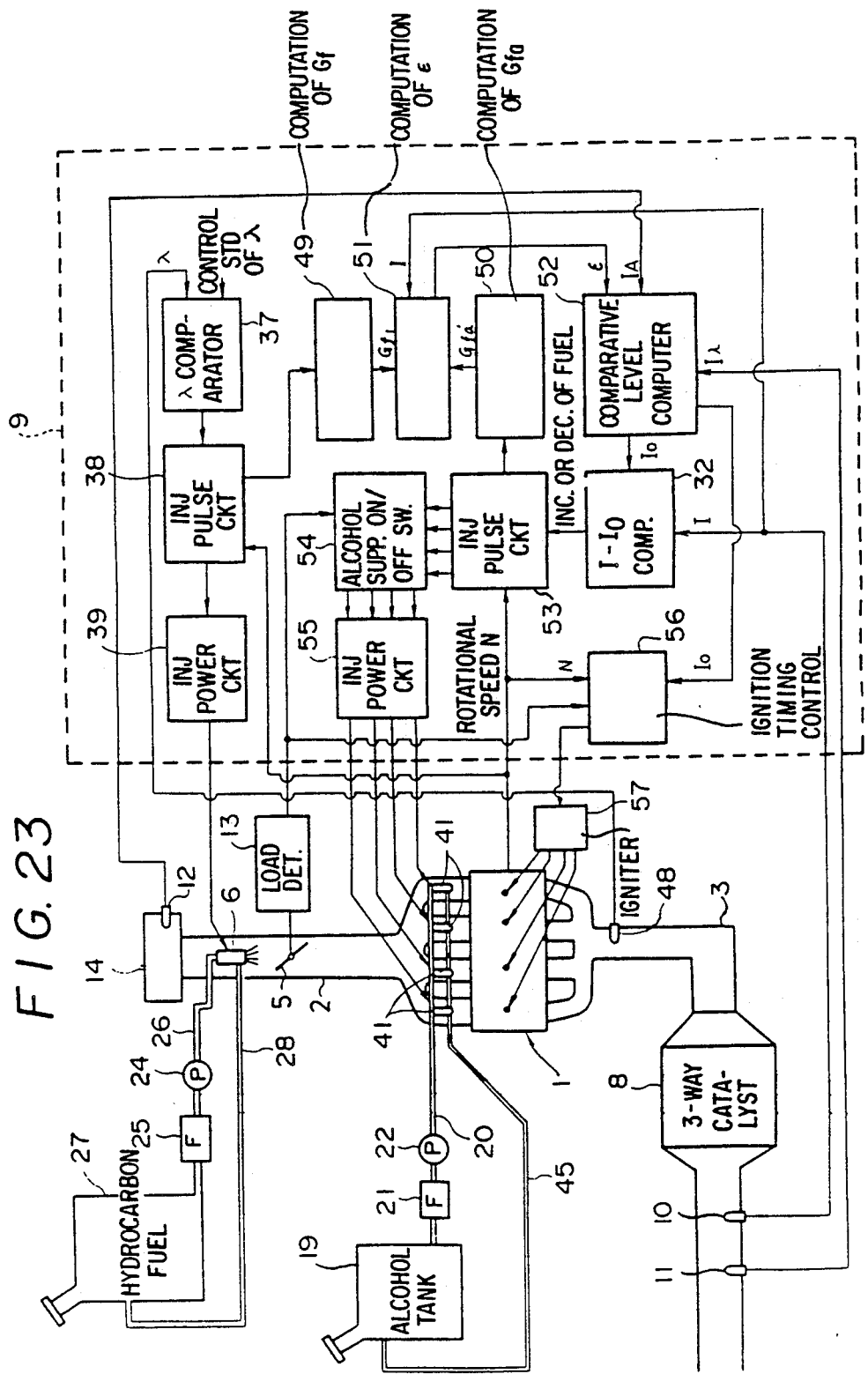
FIG. 23 is a systematic view of alcohol which is added to hydrocarbon to improve a thermal efficiency at a heavy load.

FIG. 23 shows a system in which alcohol is added and supplied to hydrocarbon fuel to improve thermal efficiency at a heavy load. A plurality of alcohol injection valves 41 are mounted to a suction pipe 2 of an engine 1 at a location just before respective suction valves, one for each cylinder. A single fuel injection valve 6 for injecting the hydrocarbon fuel is arranged upstream of a throttle valve 5. A multicomponent gas sensor 12 (on the suction side) is mounted to an air cleaner 14 which is arranged upstream of the fuel injection valve 6, to detect humidity of air, that is, $H_2O$ concentration of air supplied to the engine 1. A $\lambda$ sensor 48 is mounted on a gathering position of an exhaust pipe 3. An $O_2$-sensor 11 and a multicomponent gas sensor 10 are arranged downstream of a catalytic converter 8. When humidity in the atmosphere is detected as current $I_A$, $O_2$ concentration in the atmosphere is about 21% ($CO_2=0$) in terms of volume concentration, and is constant. Accordingly, an output from the multicomponent gas sensor 12 corresponds directly to $H_2O$ partial pressure in the atmosphere, that is, $Z \cdot P_s$ in the equation (5) or volume concentration $Z \cdot P_s/P$. Further, the system feed-back-controls $\lambda$. In order to increase the response ability to shorten a period or cycle of the feed-back control, the $\lambda$ sensor 48 and the $O_2$-sensor for detection of $O_2O$ are divided into each other. The $\lambda$ sensor 48 is arranged upstream of exhaust system in order to shorten the control period. In this system, it is possible to share the $O_2$-sensor 11 and the $\lambda$ sensor 48 by a single $O_2$-sensor. Since the multicomponent gas sensor 10 and the $O_2$-sensor 11 are arranged downstream of the catalytic converter 8, it is considered that the sensor output in the exhaust gas is brought to a value at complete combustion. Fuel is sent to a line 26 from a fuel tank 27 through a filter 25 and a pump 24. The passage is formed into a recirculation passage which is returned to the pump through a return passage 28. The fuel controls fuel pressure of the fuel injection valve 6 to a constant value. Also, substantially similarly to this, alcohol is sent to a line 20 from the alcohol tank 19 through a filter 21 and a pump 22. The alcohol is recirculated through the line 20 and a return passage 45, to make pressure of the alcohol injection valves 41 constant. During the normal operation of the engine at intermediate and light loads, an ON-OFF switch 45 of supply of alcohol within the control circuit is turned off so that transmission of alcohol injection pulses is intercepted. Thus, supply of alcohol is not done. The output from the $\lambda$ sensor 48, the rotational speed N and the load are detected to perform feed-back control of fuel in which $\lambda$ is brought to a target value ($\lambda_0$). That is $\lambda_0$ of target and the output from the $\lambda$ sensor are compared with each other at a $\lambda$ comparator 37. Injection pulses of the fuel injection valves 6 are formed at an injection pulse circuit 38. Electric power for injection driving is generated at an injection power circuit 39. Ignition timing control is in the normal mode, so that ignition is done suitable for the rotational speed N and the load L, through an igniter (ignition module) 57. When the engine is brought to a heavy load, the alcohol supply switch 54 is turned on by the output from the load detector 13, so that alcohol supply is started by the alcohol injection valves 41. The output from the multicomponent gas sensor 10 at the exhaust pipe is sent to a comparator 32 and an $\epsilon$ computer 51, and the output from the $\lambda$ sensor 48 is sent to a comparative level computer 52.

$\epsilon$ at the $\epsilon$ computing processor 51 is computer as the computation tables in FIGS. 9 and 10 from $Gf_1$ and $Gf_a'$ computed by a plurality of computing circuits 49 and 50 in view of the injection pulses of hydrocarbon and alcohol, and in view of the output I from the multicomponent gas sensor 10. In this connection, $Gf_a'$ denotes an apparent amount of alcohol addition, and $Gf_a'=(1+0.79\epsilon)Gf_a$. The target value of the output from the multicomponent gas sensor 10 corresponding to the amount of alcohol addition is determined on the basis of correction of $\epsilon$ and the atmospheric humidity, by the comparative level computer 52. $\epsilon$ correction of the target level is done by FIGS. 9 and 10, and the atmospheric humidity is corrected by the equations (3), (5) and (6). $I_0$ determined in this manner and the output from the comparator 32 on the basis of the output I from the multicomponent gas sensor 10 are transmitted to an alcohol injection pulse circuit 53. The pulses at this pulse circuit 53 increase in pulse width when I is smaller than $I_0$. Conversely, when I is larger than $I_0$, the pulse is narrowed. Accordingly, the injection pulses fluctuate with a small amplitude of fluctuation, centering around the target value of the alcohol addition. These pulses are amplified in electric power by an injection power circuit 55 through the switch 54, to drive the alcohol injection valves 41. Thus, the alcohol is correctly supplied subsantially at the target value.

On the other hand, the hydrocarbon fuel is feed-back-controlled to a predetermined $\lambda$ ($\lambda_0$) by the output from the $\lambda$ sensor 48, similarly to the intermediate and light loads. That is, $\lambda$ is automatically feed-back-controlled such that $\lambda$ with respect to supply in combination of alcohol and hydrocarbon is brought to the target value $\lambda_0$.

The ignition timing is controlled by an ignition control circuit 56 such that the ignition timing is brought to one which is in agreement with the alcohol addition and the water content ratio (water absorpion ratio) rate $\epsilon$ by the output $I_0$ from the comparative level computing processor 52 corresponding to the alcohol addition and the loads detected by the load detector 13.

As described above, the operation control system for an internal combustion engine, according to the first and second embodiments of the invention is arranged such that a mixture ratio of hydrocarbon and alcohol is detected at combustion, and the detected mixture ratio is fed back to control the engine. Thus, there is such a superior advantage that engine performance can be improved.

The alcohol-fuel supply system for an internal combustion engine, according to the third embodiment of the invention is arranged such that the alcohol is supplied optimally. With such arrangement, there is obtained such a superior advantage that the alcohol addition to the combustion chamber of the engine is effected optimally to improve performance.

The operation control system of an internal combustion engine, according to the fourth embodiment of the invention has such an advantage that the amount of water content in fuel is detected and is feed-back-controlled, whereby the engine performance can be improved.

The control system for the amount of supply of the cooling liquid for an internal combustion engine, according to the fifth embodiment of the invention has such a superior advantage that supply of the cooling liquid for reduction of temperature of the combustion gas can be done with accuracy.

said control-amount computing means computes an amount of control determining the characteristic of the engine, on the basis of the supply rate of the alcohol.

3. The operation control system for the internal combustion engine, according to claim 2, wherein
said control-amount computing means computes a target ignition-advance in which an amount of retardation increases in accordance with an increase in the supply rate of the alcohol, and
said control means controls ignition timing so as to be brought to said target ignition-advance.

4. The operation control system for the internal combustion engine, according to claim 2, wherein
said control-amount computing means computes target temperature which increases in accordance with an increase in the supply rate of the alcohol, and
said control means controls the temperature of the

TABLE 1

| | | Replacement of Surplus Hydrocarbon Fuel to Methanol at High Load $\lambda = 1$ | | | | |
|---|---|---|---|---|---|---|
| | | ADDITION OF METHANOL TO BRING $\lambda = 1$ | | | CALORIC VALUE OF ORIGINAL ENGINE | |
| A/F OF ORIGINAL ENGINE AT HIGH LOAD | A/F$_{st}$ OF HYDROCARBON FUEL | Gf$_a$/GF$_1$ | Gf$_a$/G$_A$ | H$_c$/G$_A$ [kcal/kg] | H$_{co}$/G$_A$ [kcal/kg] | |
| 8 | 14.0 | $2.574 \times 10^{-1}$ | $1.644 \times 10^{-2}$ | 796.7 | 785.7 | |
| 8 | 15.2 | $3.089 \times 10^{-1}$ | $1.797 \times 10^{-2}$ | 742.5 | 723.7 | |
| 13 | 14.0 | $2.387 \times 10^{-2}$ | $1.686 \times 10^{-3}$ | 786.8 | 785.7 | |
| 13 | 15.2 | $5.250 \times 10^{-2}$ | $3.379 \times 10^{-3}$ | 727.2 | 723.7 | |

TABLE 2

| | | Replacement of Surplus Hydrocarbon Fuel to Ethanol at High Load $\lambda = 1$ | | | | |
|---|---|---|---|---|---|---|
| | | ADDITION OF ETHANOL TO BRING $\lambda = 1$ | | | CALORIC VALUE OF ORIGINAL ENGINE | |
| A/F OF ORIGINAL ENGINE AT HIGH LOAD | A/F$_{st}$ OF HYDROCARBON FUEL | Gf$_a$/Gf$_1$ | Gf$_a$/G$_A$ | H$_c$/G$_A$ [kcal/kg] | H$_{co}$/G$_A$ [kcal/kg] | |
| 8 | 14.0 | $4.244 \times 10^{-1}$ | $2.384 \times 10^{-2}$ | 792.4 | 785.7 | |
| 8 | 15.2 | $5.092 \times 10^{-1}$ | $2.577 \times 10^{-2}$ | 745.3 | 723.7 | |
| 13 | 14.0 | $3.500 \times 10^{-2}$ | $2.445 \times 10^{-3}$ | 786.4 | 785.7 | |
| 13 | 15.2 | $7.699 \times 10^{-2}$ | $4.845 \times 10^{-3}$ | 727.7 | 723.7 | |

What is claimed is:

1. An operation control system for an internal combustion engine, comprising:
   (a) means for supplying an air-fuel mixture of fuel and air, into a combustion chamber;
   (b) means for detecting vapor concentration in exhaust gas;
   (c) means for detecting an air excess ratio of the air-fuel mixture supplied to the combustion chamber;
   (d) means for computing a supply condition of the fuel on the basis of said vapor concentration and said air excess ratio;
   (e) means for computing an amount of control determining a characteristic of the engine, on the basis of said supply condition of the fuel; and
   (f) means for controlling the engine on the basis of said amount of control.

2. The operation control system for the internal combustion engine, according to claim 1, wherein
said supply means supplies hydrocarbon and alcohol as the fuel,
said supply-condition computing means computes the supply rate of the alcohol as the supply condition of the fuel, and coolant for the engine so as to be brought to said target temperature.

5. The operation control system for the internal combustion engine, according to claim 2, wherein
said control-amount computing means computes a target air excess ratio which increases in accordance with an increase in the supply rate of the alcohol, and
said control means controls the air excess ratio so as to be brought to said target air excess ratio.

6. The operation control system for the internal combustion engine, according to claim 2, wherein
said control-amount computing means computes a target compression ratio which increases in accordance with an increase in the supply rate of the alcohol, and
said control means controls the compression ratio so as to be brought to said target compression ratio.

7. The operation control system for the internal combustion engine, according to claim 2, wherein
said control-amount computing means computes a signal which is outputted when the supply rate of the alcohol is different from a predetermined standard value by a value at least equal to a predetermined difference value, and said control means controls the hydrocarbon and the alcohol so as to be agitated when said signal is outputted.

8. The operation control system for the internal combustion engine, according to claim 2,
further comprising means for detecting vapor concentration in the atmosphere, and wherein
said supply-condition computing means computes the supply rate of the alcohol on the basis of a difference subtracting the vapor concentration in the atmosphere from the vapor concentration in the exhaust gas and said air excess ratio.

9. The operation control system for the internal combustion engine, according to claim 1,
further comprising means for detecting an engine load, and wherein
said supply means supplies hydrocarbon as the fuel when the engine load is brought to a value at least equal to a predetermined value, and said supply means supplies the hydrocarbon and alcohol when the engine load exceeds the predetermined value.

10. The operation control system for the internal combustion engine, according to claim 1,
further comprising means for detecting an engine load, and wherein
said supply means supplies hydrocarbon as the fuel when the engine load is brought to a value at least equal to a predetermined value, and said supply means supplies the hydrocarbon and alcohol when the engine load exceeds the predetermined value,
said supply-condition computing means computes the supply rate of the alcohol at the time the engine load exceeds the predetermined value, as the supply condition of the fuel, and
said control-amount computing means computes the amount of control determining the characteristic of the engine at the time the engine load exceeds the predetermined value, on the basis of the supply rate of the alcohol.

11. The operation control system for the internal combustion engine, according to claim 1, wherein
said supply means supplies, as the fuel, any one of alcohol fuel and fuel containing alcohol,
said supply-condition computing means computes a water absorption ratio of the alcohol as the supply condition of the fuel, and
said control-amount computing means computes the amount of control determining the characteristic of the engine, on the basis of the water absorption ratio of the alcohol.

12. The operation control system for the internal combustion engine, according to claim 11, wherein
said control-amount computing means computes a target ignition-advance whose amount of advance increases in accordance with an increase in the water absorption ratio of the alcohol, and
said control means controls ignition timing so as to be brought to said target ignition-advance.

13. The operation control system for the internal combustion engine, according to claim 11, wherein
said control-amount computing means computes target temperature which increases in accordance with an increase in the water absorption ratio of the alcohol, and
said control means controls temperature of engine coolant so as to be brought to said target temperature.

14. The operation control system for the internal combustion engine, according to claim 11, wherein
said control-amount computing means computes a target air-excess ratio which decreases in accordance with an increase in the water absorption ratio of the alcohol, and
said control means controls air excess ratio so as to be brought to said target air-excess ratio.

15. The operation control system for the internal combustion engine, according to claim 11, wherein
said control-amount computing means computes a target compression ratio which increases in accordance with an increase in the water absorption ratio of the alcohol, and
said control means controls a compression ratio so as to be brought to said target compression ratio.

16. The operation control system for the internal combustion engine, according to claim 11,
further comprising means for detecting vapor concentration in the atmosphere, and wherein
said supply-condition computing means computes a water absorption ratio of the alcohol on the basis of a difference subtracting the vapor concentration in the atmosphere from the vapor concentration in the exhaust gas and said air excess ratio.

17. An operation control system for an internal combustion engine, comprising:
(a) means for detecting vapor concentration in exhaust gas;
(b) means for detecting an air excess ratio of air-fuel mixture supplied to a combustion chamber;
(c) means for detecting an engine load;
(d) means for computing an amount of cooling liquid supplied to said combustion chamber, on the basis of said vapor concentration and said air excess ratio; and
(e) means for controlling an amount of fuel supply on the basis of said air excess ratio when the engine load is at least equal to a predetermined value, and for controlling the cooling liquid so as to be supplied in addition to the fuel at the time the engine load exceeds the predetermined value thereby bringing said amount of cooling liquid to a target value.

18. The operation control system for the internal combustion engine, according to claim 17,
further comprising means for detecting vapor concentration in the atmosphere, and wherein
said computing means computes the amount of cooling liquid supplied to the combustion chamber, on the basis of a difference subtracting the vapor concentration in the atmosphere from the vapor concentration in the exhaust gas and said air excess ratio.

19. The operation control system for the internal combustion engine, according to claim 17, wherein
said cooling liquid is at least one of water and alcohol.

20. The operation control system for the internal combustion engine, according to claim 18, wherein
said cooling liquid is at least one of water and alcohol.

* * * * *